(12) United States Patent
Takada et al.

(10) Patent No.: US 10,664,114 B2
(45) Date of Patent: May 26, 2020

(54) DETECTION DEVICE AND DISPLAY DEVICE

(71) Applicant: Japan Display Inc., Tokyo (JP)

(72) Inventors: Naoki Takada, Tokyo (JP); Takayuki Nakanishi, Tokyo (JP)

(73) Assignee: Japan Display Inc., Tokyo (JP)

( * ) Notice: Subject to any disclaimer, the term of this patent is extended or adjusted under 35 U.S.C. 154(b) by 2 days.

(21) Appl. No.: 16/144,419

(22) Filed: Sep. 27, 2018

(65) Prior Publication Data

US 2019/0102009 A1 Apr. 4, 2019

(30) Foreign Application Priority Data

Sep. 29, 2017 (JP) .................. 2017-192032

(51) Int. Cl.
| | |
|---|---|
| *G06F 3/044* | (2006.01) |
| *G02F 1/1333* | (2006.01) |
| *G02F 1/1362* | (2006.01) |
| *G02F 1/1343* | (2006.01) |
| *G06F 3/041* | (2006.01) |

(52) U.S. Cl.
CPC ............ *G06F 3/044* (2013.01); *G02F 1/1343* (2013.01); *G02F 1/13338* (2013.01); *G02F 1/136286* (2013.01); *G06F 3/0412* (2013.01); *G06F 3/0416* (2013.01); *G06F 3/0445* (2019.05); *G06F 3/0446* (2019.05); *G06F 2203/04108* (2013.01)

(58) Field of Classification Search
CPC ............... G06F 3/0416; G06F 3/04166; G06F 3/041661; G06F 3/041662; G06F 3/044–0448; G06F 2203/04101; G06F 2203/04108
See application file for complete search history.

(56) References Cited

U.S. PATENT DOCUMENTS

| | | | | |
|---|---|---|---|---|
| 8,723,841 B2* | 5/2014 | Ishizaki | .................. | G06F 3/044 345/178 |
| 9,383,868 B2* | 7/2016 | Yamaguchi | ............. | G06F 3/044 |
| 9,417,747 B2* | 8/2016 | Yumoto | .................. | G06F 3/044 |
| 9,721,536 B2* | 8/2017 | Kurasawa | ............... | G06F 3/044 |

(Continued)

FOREIGN PATENT DOCUMENTS

JP 2009244958 A 10/2009

OTHER PUBLICATIONS

Noguchi et al., U.S. Appl. No. 15/953,894, filed Apr. 16, 2018.

*Primary Examiner* — Gene W Lee

(74) *Attorney, Agent, or Firm* — K&L Gates LLP

(57) ABSTRACT

According to an aspect, a detection device includes: at least one substrate; a plurality of first electrodes extending in a first direction of the substrate and are arrayed in a second direction intersecting the first direction; a plurality of second electrodes arrayed in a row-column configuration in a layer different from a layer of the first electrodes; and a coupling circuit configured to switch between a first coupling state of electrically coupling a plurality of second electrodes arrayed in the second direction to one another, and a second coupling state of electrically coupling a plurality of second electrodes to one another. A combination of the second electrodes is different from a combination of the second electrodes in the first coupling state.

5 Claims, 22 Drawing Sheets

(56) References Cited

U.S. PATENT DOCUMENTS

| | | | |
|---|---|---|---|
| 9,753,588 B2* | 9/2017 | Tsai | G06F 3/0412 |
| 9,760,220 B2* | 9/2017 | Tanaka | G06F 3/044 |
| 9,870,110 B2* | 1/2018 | Lee | G06F 3/044 |
| 10,139,963 B2* | 11/2018 | Ishizaki | G09G 3/3611 |
| 10,185,426 B2* | 1/2019 | Kurasawa | G06F 3/0412 |
| 10,310,684 B2* | 6/2019 | Ishizaki | G06F 3/044 |
| 2010/0182273 A1 | 7/2010 | Noguchi et al. | |
| 2011/0279408 A1* | 11/2011 | Urano | G06F 3/044 |
| | | | 345/174 |
| 2013/0265276 A1* | 10/2013 | Obeidat | G06F 3/044 |
| | | | 345/174 |
| 2015/0160754 A1* | 6/2015 | Wenzel | G06F 3/044 |
| | | | 345/174 |
| 2015/0220204 A1* | 8/2015 | Noguchi | G06F 3/0412 |
| | | | 345/174 |
| 2016/0179251 A1* | 6/2016 | Lee | G06F 3/044 |
| | | | 345/174 |
| 2017/0017336 A1* | 1/2017 | Mayumi | G06F 3/044 |
| 2017/0206393 A1* | 7/2017 | Chia | G06F 3/04886 |
| 2018/0113531 A1* | 4/2018 | Na | G06F 3/0412 |
| 2018/0335880 A1* | 11/2018 | Seol | G06F 3/0488 |
| 2018/0348950 A1* | 12/2018 | Nakanishi | G06F 3/0416 |

* cited by examiner

DETECTION ELECTRODE BLOCK BKD

DETECTION DEVICE AND DISPLAY DEVICE

CROSS-REFERENCE TO RELATED APPLICATIONS

This application claims priority from Japanese Application No. 2017-192032, filed on Sep. 29, 2017, the contents of which are incorporated by reference herein in its entirety.

BACKGROUND

1. Technical Field

The present disclosure relates to a detection device and a display device.

2. Description of the Related Art

Touch detection devices capable of detecting an external proximity object, or so-called touch panels, have recently been attracting attention. Japanese Patent Application Laid-open Publication No. 2009-244958 discloses that a touch panel is mounted on or integrated with a display device, such as a liquid crystal display device, and used as a display device with a touch detection function. Various functions of such display devices are known, including a touch detection function to detect contact of an operator's finger with a screen and a hover detection (proximity detection) function to detect a proximity state, a gesture, or the like of the finger not in contact with the screen.

Touch detection and hover detection are significantly different in a distance between detection electrodes and a target object serving as a detection target, such as a finger, and in sensitivity required for the detection. If electrodes and a drive configuration for touch detection are used for hover detection without any change, desirable hover detection may be difficult. Increasing the area of the detection electrodes is an effective way to increase detection sensitivity in hover detection. In this case, however, detection accuracy in touch detection may decrease.

SUMMARY

According to an aspect, a detection device includes: at least one substrate; a plurality of first electrodes extending in a first direction of the substrate and are arrayed in a second direction intersecting the first direction; a plurality of second electrodes arrayed in a row-column configuration in a layer different from a layer of the first electrodes; and a coupling circuit configured to switch between a first coupling state of electrically coupling a plurality of second electrodes arrayed in the second direction to one another, and a second coupling state of electrically coupling a plurality of second electrodes to one another. A combination of the second electrodes is different from a combination of the second electrodes in the first coupling state.

According to another aspect, a display device includes: a display panel including a detection device; and a display region. The second electrodes are provided in a region overlapping the display region. The detection device includes: at least one substrate; a plurality of first electrodes extending in a first direction of the substrate and are arrayed in a second direction intersecting the first direction; a plurality of second electrodes arrayed in a row-column configuration in a layer different from a layer of the first electrodes; and a coupling circuit configured to switch between a first coupling state of electrically coupling a plurality of second electrodes arrayed in the second direction to one another, and a second coupling state of electrically coupling a plurality of second electrodes to one another, a combination of the second electrodes being different from a combination of the second electrodes in the first coupling state.

DETAILED DESCRIPTION

Figure 1:
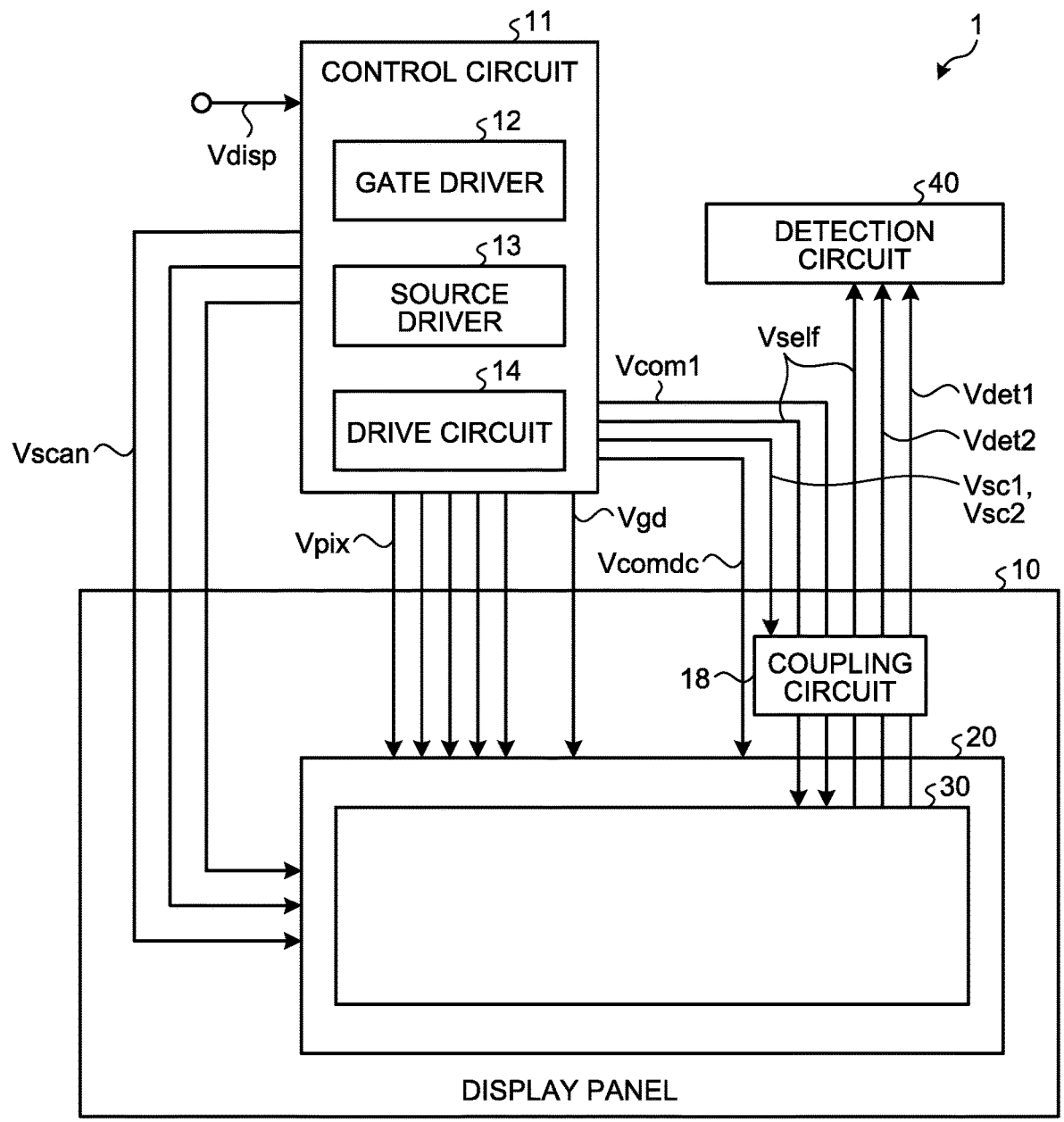
FIG. 1 is a block diagram illustrating an exemplary configuration of a detection device and a display device according to a first embodiment of the present disclosure.

Exemplary aspects (embodiments) to embody the present disclosure are described below in greater detail with reference to the accompanying drawings. The contents described in the embodiments are not intended to limit the present disclosure. Components described below include components easily conceivable by those skilled in the art and components substantially identical therewith. Furthermore, the components described below may be appropriately combined. What is disclosed herein is given by way of example only, and appropriate changes made without departing from the spirit of the present disclosure and easily conceivable by those skilled in the art naturally fall within the scope of the disclosure. To simplify the explanation, the drawings may possibly illustrate the width, the thickness, the shape, and other elements of each unit more schematically than the actual aspect. These elements, however, are given by way of example only and are not intended to limit interpretation of the present disclosure. In the present disclosure and the figures, components similar to those previously described with reference to previous figures are denoted by like reference numerals, and detailed explanation thereof may be appropriately omitted. In this disclosure, when an element A is described as being "on" another element B, the element A can be directly on the other element B, or there can be one or more elements between the element A and the other element B.

First Embodiment

Figure 2:
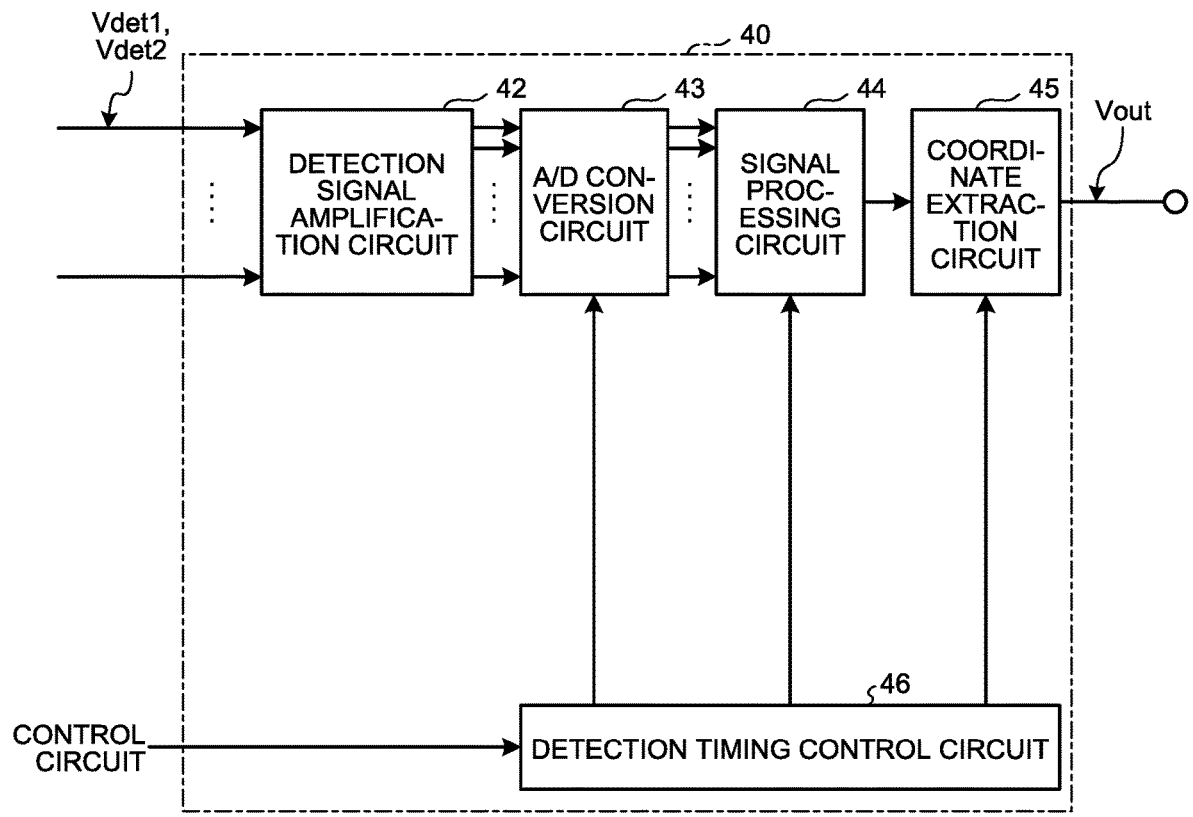
FIG. 2 is a block diagram illustrating an exemplary configuration of a detection circuit.

FIG. 1 is a block diagram illustrating an exemplary configuration of a detection device and a display device according to a first embodiment of the present disclosure. FIG. 2 is a block diagram illustrating an exemplary configuration of a detection circuit. As illustrated in FIG. 1, a display device 1 includes a display panel 10, a control circuit 11, and a detection circuit 40. The display panel 10 includes a display region 20 and a sensor region 30. The display region 20 displays an image. The sensor region 30 is included in the detection device that detects touch input. The block diagrams in FIGS. 1 and 2 conceptually explain the configuration, and the detection device and the display device may have another configuration.

The display panel 10 is a display device in which the display region 20 and the sensor region 30 are integrated with each other. Specifically, in the display panel 10, part of elements, such as electrodes and substrates, of the display region 20 are also used as electrodes and substrates of the sensor region 30.

The display region 20 includes a liquid crystal display element serving as a display element. The display region 20 includes a plurality of pixels each having the display element and has a display surface facing the pixels. The display region 20 receives video signals to display an image composed of the pixels on the display surface. The display region 20 may be an organic electroluminescence (EL) display panel, for example.

The display panel 10 further includes a coupling circuit 18. The coupling circuit 18 is provided between the sensor region 30 and the detection circuit 40. The coupling circuit 18 switches between coupling and decoupling of second electrodes TDL, which are targets of detection drive, to and from the detection circuit 40 in accordance with control signals Vsc1 and Vsc2 supplied from the control circuit 11.

The control circuit 11 includes a gate driver 12, a source driver 13, and a drive circuit 14. The control circuit 11 supplies control signals to the gate driver 12, the source driver 13, the drive circuit 14, the coupling circuit 18, and the detection circuit 40 in accordance with video signals Vdisp supplied from the outside, thereby controlling a display operation and a detection operation.

The gate driver 12 supplies scanning signals Vscan to one horizontal line to be a target of display drive in the display panel 10, in accordance with the control signals supplied from the control circuit 11. Accordingly, one horizontal line to be a target of display drive is sequentially or simultaneously selected.

The source driver 13 is a circuit that supplies pixel signals Vpix to respective sub-pixels SPix (refer to FIG. 14) in the display region 20. Part of the functions of the source driver 13 may be provided to the display panel 10. In this case, the control circuit 11 may generate the pixel signals Vpix and supply them to the source driver 13.

The drive circuit 14 supplies drive signals Vcomdc for display to first electrodes COML of the display panel 10. The drive circuit 14 supplies first drive signals Vcom1 for detection to the first electrodes COML of the display panel 10 or supplies second drive signals Vself to the second electrodes TDL via the coupling circuit 18.

The control circuit 11 according to the present embodiment time-divisionally performs a display mode for performing display in the display region 20 and a detection mode for detecting a target object in the sensor region 30. The control circuit 11 has two detection modes, that is, a touch detection mode (first detection mode) and a hover detection mode (second detection mode). Alternatively, the first detection mode is a mutual capacitance detection mode, and the second detection mode is a self-capacitance detection mode. In the present disclosure, touch detection is referred to as detection of the position of the target object in a state where the target object is in contact with a detection surface or the display surface or proximate enough to the detection surface or the display surface so as to be equated with being in contact therewith (hereinafter, referred to as a "contact state"). Hover detection is referred to as detection of the position and a movement of the target object in a state where the target object is not in contact with the detection surface or the display surface or not proximate enough to the detection surface or the display surface so as be equated with being in contact therewith (hereinafter, referred to as a "non-contact state"). A state where no target object is present at a position facing the detection surface or the display surface or a state where the target object is too far away from the display surface to be detected in hover detection is referred to as a "non-present state".

In the sensor region 30, the detection device performs touch detection based on the basic principle of touch detection by a mutual capacitance method (also referred to as a mutual method). If the detection device detects the target object in the contact state in the sensor region 30, the detection device outputs first detection signals Vdet1 to the detection circuit 40. In the sensor region 30, the detection device performs hover detection based on the basic principle of touch detection by a self-capacitance method (also referred to as a self-method). If the detection device detects the target object in the non-contact state in the sensor region 30, the detection device outputs second detection signals Vdet2 to the detection circuit 40 via the coupling circuit 18.

In mutual capacitance detection, the detection circuit 40 determines whether a touch is made by the target object on the display surface of the display panel 10, in accordance with the control signals supplied from the control circuit 11 and the first detection signals Vdet1 output from the display panel 10. If a touch is detected, the detection circuit 40 calculates the coordinates at which the touch input is performed, for example. In self-capacitance hover detection, the detection circuit 40 can detect the position and a movement, such as a gesture, of the target object in the non-contact state, in accordance with the control signals supplied from the control circuit 11 and the second detection signals Vdet2 output from the display panel 10.

As illustrated in FIG. 2, the detection circuit 40 includes a detection signal amplification circuit 42, an analog/digital (A/D) conversion circuit 43, a signal processing circuit 44, a coordinate extraction circuit 45, and a detection timing control circuit 46. The detection timing control circuit 46 controls the A/D conversion circuit 43, the signal processing circuit 44, and the coordinate extraction circuit 45 to operate in synchronization with one another, in accordance with the control signals supplied from the control circuit 11.

In touch detection, the detection signal amplification circuit 42 amplifies the first detection signals Vdet1 supplied from the display panel 10. The A/D conversion circuit 43 samples analog signals output from the detection signal amplification circuit 42 at a timing synchronized with the first drive signals Vcom1, thereby converting the analog signals into digital signals.

The signal processing circuit 44 is a logic circuit that determines whether a touch is made on the display panel 10 in accordance with the output signals from the A/D conversion circuit 43. The signal processing circuit 44 performs processing of extracting a signal (absolute value |ΔV|) of a difference between the detection signals caused by a finger. The signal processing circuit 44 compares the absolute value |ΔV| with a predetermined threshold voltage. If the absolute value |ΔV| is lower than the threshold voltage, the signal processing circuit 44 determines that the target object is in the non-present state. By contrast, if the absolute value |ΔV| is equal to or higher than the threshold voltage, the signal processing circuit 44 determines that the target object is in the contact or proximity state (contact state). The detection circuit 40 thus can perform touch detection.

The coordinate extraction circuit 45 is a logic circuit that calculates, if the signal processing circuit 44 detects a touch, the touch panel coordinates of the touch. The coordinate extraction circuit 45 outputs the touch panel coordinates as output signals Vout. The coordinate extraction circuit 45 may output the output signals Vout to the control circuit 11. The control circuit 11 can perform a predetermined display operation or a detection operation based on the output signals Vout.

In hover detection, the detection circuit 40 performs the same processing as that described above, in accordance with the second detection signals Vdet2 supplied from the display panel 10. If the signal processing circuit 44 detects the target object in the non-contact state, the coordinate extraction circuit 45 calculates the coordinates of the target object. The detection circuit 40 thus can detect the position and a movement, such as a gesture, of the target object in the non-contact state.

The detection signal amplification circuit 42, the A/D conversion circuit 43, the signal processing circuit 44, the coordinate extraction circuit 45, and the detection timing control circuit 46 of the detection circuit 40 are provided to the display device 1. The configuration is not limited thereto, and all or part of the functions of the detection circuit 40 may be provided to an external processor, for example. The coordinate extraction circuit 45, for example, may be provided to an external processor different from the display device 1. In this case, the detection circuit 40 may output the signals processed by the signal processing circuit 44 as the output signals Vout.

Figure 3:
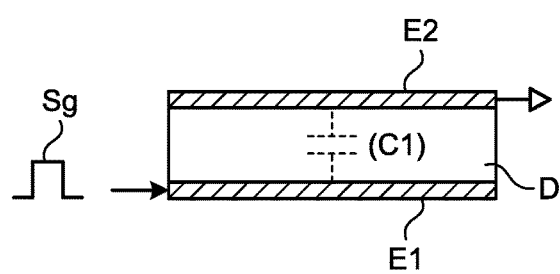
FIG. 3 is a diagram illustrating a non-present state for explaining the basic principle of mutual capacitance detection.
Figure 4:
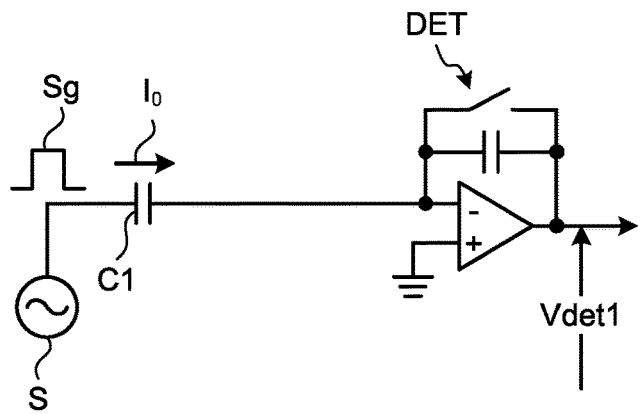
FIG. 4 is an explanatory diagram illustrating an example of an equivalent circuit in mutual capacitance detection in the non-present state.
Figure 5:
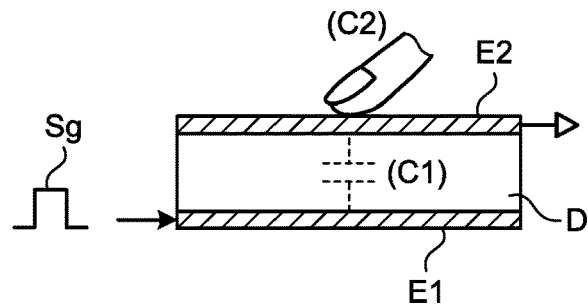
FIG. 5 is a diagram illustrating a contact state for explaining the basic principle of mutual capacitance detection.
Figure 6:
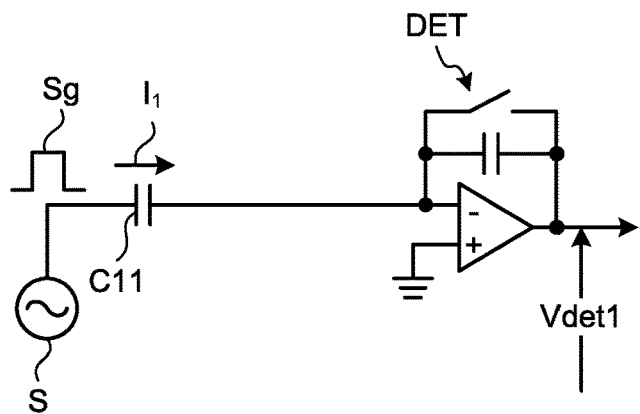
FIG. 6 is an explanatory diagram illustrating an example of an equivalent circuit in mutual capacitance detection in the contact state.
Figure 7:
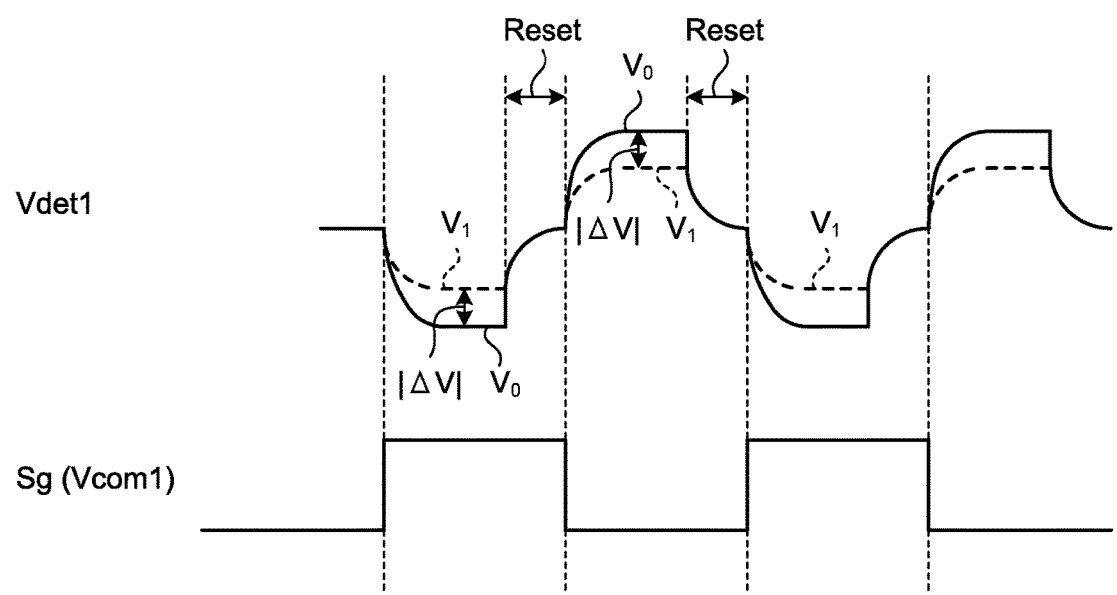
FIG. 7 is a diagram illustrating an example of waveforms of a drive signal and a detection signal in mutual capacitance detection.

The display panel 10 performs touch control based on the basic principle of capacitance touch detection. The following describes the basic principle of mutual capacitance touch detection performed by the display device 1 according to the present embodiment with reference to FIGS. 3 to 7. FIG. 3 is a diagram illustrating the non-present state for explaining the basic principle of mutual capacitance detection. FIG. 4 is an explanatory diagram illustrating an example of an equivalent circuit in mutual capacitance detection in the non-present state. FIG. 5 is a diagram illustrating the contact state for explaining the basic principle of mutual capacitance detection. FIG. 6 is an explanatory diagram illustrating an example of an equivalent circuit in mutual capacitance detection in the contact state. FIG. 7 is a diagram illustrating an example of waveforms of a drive signal and a detection signal in mutual capacitance detection. While the following describes a case where a finger is in contact with or in proximity to a detection electrode, the target object is not limited to a finger and may be an object including a conductor, such as a stylus.

As illustrated in FIG. 3, a capacitance element C1 includes a pair of electrodes, that is, a drive electrode E1 and a detection electrode E2 facing each other with a dielectric D interposed therebetween. The capacitance element C1 generates lines of electric force for a fringe extending from the ends of the drive electrode E1 to the upper surface of the detection electrode E2 in addition to lines of electric force (not illustrated) formed between the facing surfaces of the drive electrode E1 and the detection electrode E2. As illustrated in FIG. 4, a first end of the capacitance element C1 is coupled to an alternating-current (AC) signal source (drive signal source) S, and a second end thereof is coupled to a voltage detector DET. The voltage detector DET is an integration circuit included in the detection signal amplification circuit 42 illustrated in FIG. 2, for example.

When the AC signal source S applies an AC rectangular wave Sg at a predetermined frequency (e.g., a frequency of several kilohertz to several hundred kilohertz) to the drive electrode E1 (first end of the capacitance element C1), an output waveform (first detection signal Vdet1) illustrated in FIG. 7 appears via the voltage detector DET. The AC rectangular wave Sg corresponds to the first drive signal Vcom1 received from the drive circuit 14.

As illustrated in FIGS. 3 and 4, in the non-present state, an electric current $I_0$ corresponding to a capacitance value of the capacitance element C1 flows. The voltage detector DET illustrated in FIG. 4 converts fluctuations in electric current depending on the AC rectangular wave Sg into fluctuations in voltage (waveform $V_0$ indicated by the solid line (refer to FIG. 7)).

As illustrated in FIGS. 5 and 6, in the contact state, capacitance C2 formed by the finger is in contact with the detection electrode E2 or proximate enough to the detection electrode E2 so as to be equated with being in contact therewith. The lines of electric force for a fringe between the drive electrode E1 and the detection electrode E2 are blocked by the conductor (finger). As a result, the capacitance element C1 acts as a capacitance element C11 having a capacitance value smaller than that in the non-present state. As illustrated in FIGS. 5 and 6, the voltage detector DET converts fluctuations in electric current $I_1$ depending on the AC rectangular wave Sg into fluctuations in voltage (waveform $V_1$ indicated by the dotted line (refer to FIG. 7)).

In this case, the waveform $V_1$ has amplitude smaller than that of the waveform $V_0$. The absolute value $|\Delta V|$ of the voltage difference between the waveform $V_0$ and the waveform $V_1$ varies depending on the influence of an external object, such as a finger, in contact with or in proximity to the detection electrode from the outside. The voltage detector DET resets charge and discharge of a capacitor in accordance with the frequency of the AC rectangular wave Sg by switching in the circuit to have a period Reset. With the period Reset, the voltage detector DET accurately detects the absolute value $|\Delta V|$ of the voltage difference.

As described above, the detection circuit 40 determines whether an external proximity object is in the non-present state or in the contact or proximity state by comparing the absolute value $|\Delta V|$ with the predetermined threshold voltage. The detection circuit 40 thus can perform touch detection based on the basic principle of mutual capacitance detection.

Figure 8:
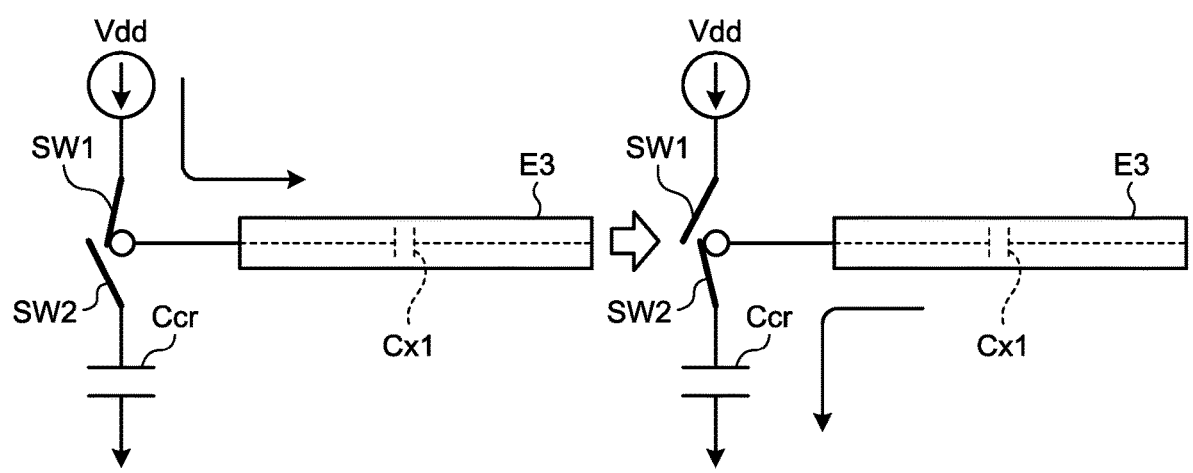
FIG. 8 is a diagram illustrating the non-present state for explaining the basic principle of self-capacitance detection.
Figure 9:
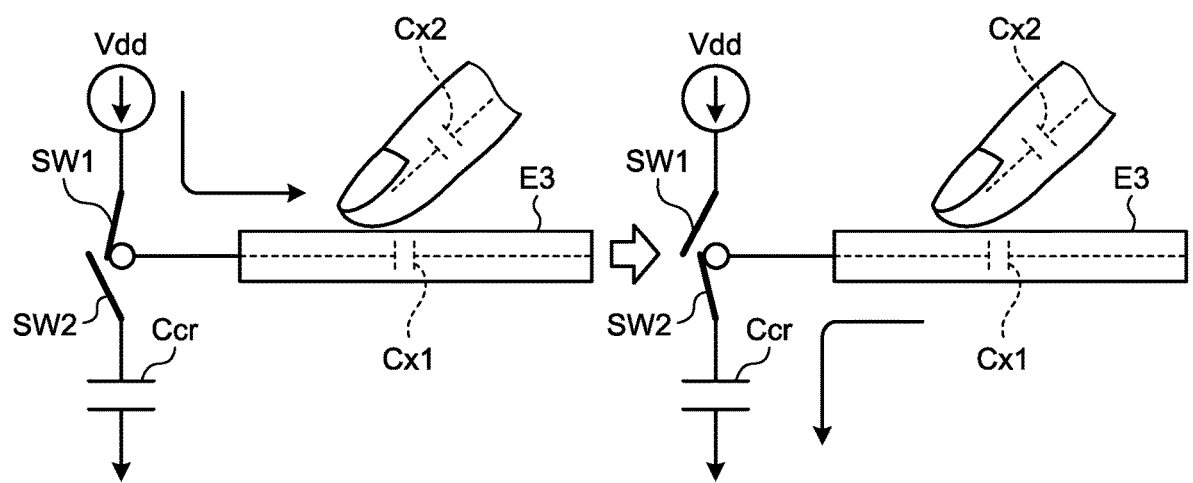
FIG. 9 is a diagram illustrating the contact state for explaining the basic principle of self-capacitance detection.
Figure 10:
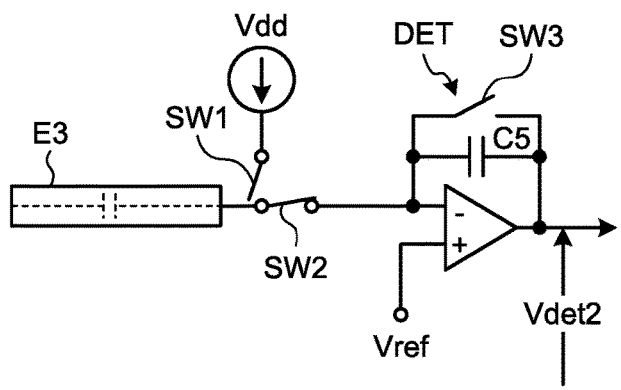
FIG. 10 is an explanatory diagram illustrating an example of an equivalent circuit in self-capacitance detection.
Figure 11:
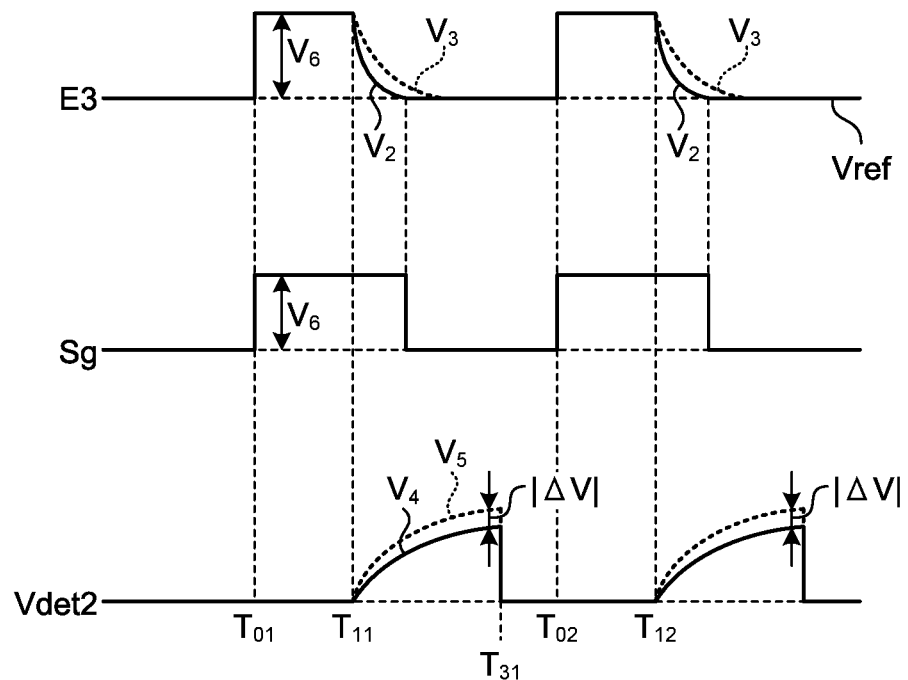
FIG. 11 is a diagram illustrating an example of waveforms of a drive signal and a detection signal in self-capacitance detection.

The following describes the basic principle of self-capacitance detection with reference to FIGS. 8 to 11. FIG. 8 is a diagram illustrating the non-present state for explaining the basic principle of self-capacitance detection. FIG. 9 is a diagram illustrating the contact state for explaining the basic principle of self-capacitance detection. FIG. 10 is an explanatory diagram illustrating an example of an equivalent circuit in self-capacitance detection. FIG. 11 is a diagram illustrating an example of waveforms of a drive signal and a detection signal in self-capacitance detection.

The left figure of FIG. 8 indicates that, in the non-present state, a detection electrode E3 is coupled to a power source Vdd by a switch SW1 but is not coupled to a capacitor Ccr by a switch SW2. In this state, capacitance Cx1 in the detection electrode E3 is charged. The right figure of FIG. 8 indicates that coupling between the power source Vdd and the detection electrode E3 is cut off by the switch SW1, and the detection electrode E3 is coupled to the capacitor Ccr by the switch SW2. In this state, an electric charge in the capacitance Cx1 is discharged via the capacitor Ccr.

The left figure of FIG. 9 indicates that, in the contact state, the detection electrode E3 is coupled to the power source Vdd by the switch SW1 but is not coupled to the capacitor Ccr by the switch SW2. In this state, capacitance Cx2 generated by the finger in proximity to the detection electrode E3 is charged in addition to the capacitance Cx1 in the detection electrode E3. The right figure of FIG. 9 indicates that coupling between the power source Vdd and the detection electrode E3 is cut off by the switch SW1, and the detection electrode E3 is coupled to the capacitor Ccr by the switch SW2. In this state, electric charges in the capacitance Cx1 and the capacitance Cx2 are discharged via the capacitor Ccr.

The voltage change characteristics of the capacitor Ccr in discharging (contact state) illustrated in the right figure of FIG. 9 are clearly different from those of the capacitor Ccr in discharging (non-present state) illustrated in the right figure of FIG. 8, due to the presence of the capacitance Cx2. In the self-capacitance method, whether an input operation is performed by a finger or the like is determined by using the difference of the voltage change characteristics of the capacitor Ccr due to the presence of the capacitance Cx2.

Specifically, an AC rectangular wave Sg (refer to FIG. 11) at a predetermined frequency (e.g., a frequency of several kilohertz to several hundred kilohertz) is applied to the detection electrode E3. The voltage detector DET illustrated in FIG. 10 converts fluctuations in electric current depending on the AC rectangular wave Sg into fluctuations in voltage (waveforms $V_4$ and $V_5$ (refer to FIG. 11)).

As illustrated in FIG. 11, the voltage level of the AC rectangular wave Sg rises to a voltage $V_6$ at time $T_{01}$. At this time, the switch SW1 is turned on, and the switch SW2 is turned off. As a result, the electric potential of the detection electrode E3 also rises to the voltage $V_6$. Subsequently, the switch SW1 is turned off before time $T_{11}$. While the detection electrode E3 is in a floating state at this time, the electric potential of the detection electrode E3 is maintained at $V_6$ due to the capacitance Cx1 (or Cx1+Cx2, refer to FIG. 9) of the detection electrode E3. The voltage detector DET performs a reset operation before time $T_{11}$. The reset operation makes an output voltage substantially equal to Vref.

Subsequently, when the switch SW2 is turned on at time $T_{11}$, the electric charge accumulated in the capacitance Cx1 (or Cx1+Cx2) of the detection electrode E3 moves to capacitance C5 in the voltage detector DET. As a result, output from the voltage detector DET increases (refer to the second detection signal Vdet2 in FIG. 11). In the non-present state, the output (second detection signal Vdet2) from the voltage detector DET corresponds to a waveform $V_2$ indicated by the solid line, and Vdet2=Cx1×$V_6$/C5 is satisfied. In the contact state, the output corresponds to a waveform $V_3$ indicated by the dotted line, and Vdet2=(Cx1+Cx2)×$V_6$/C5 is satisfied.

Subsequently, at time $T_{31}$, the switch SW2 is turned off, and the switch SW1 and a switch SW3 are turned on. As a result, the electric potential of the detection electrode E3 is reduced to a low level equal to the electric potential of the AC rectangular wave Sg, and the voltage detector DET is reset. The operation described above is repeated at a predetermined frequency (e.g., a frequency of several kilohertz to several hundred kilohertz). The detection circuit 40 thus can perform touch detection based on the basic principle of self-capacitance detection.

Figure 12:
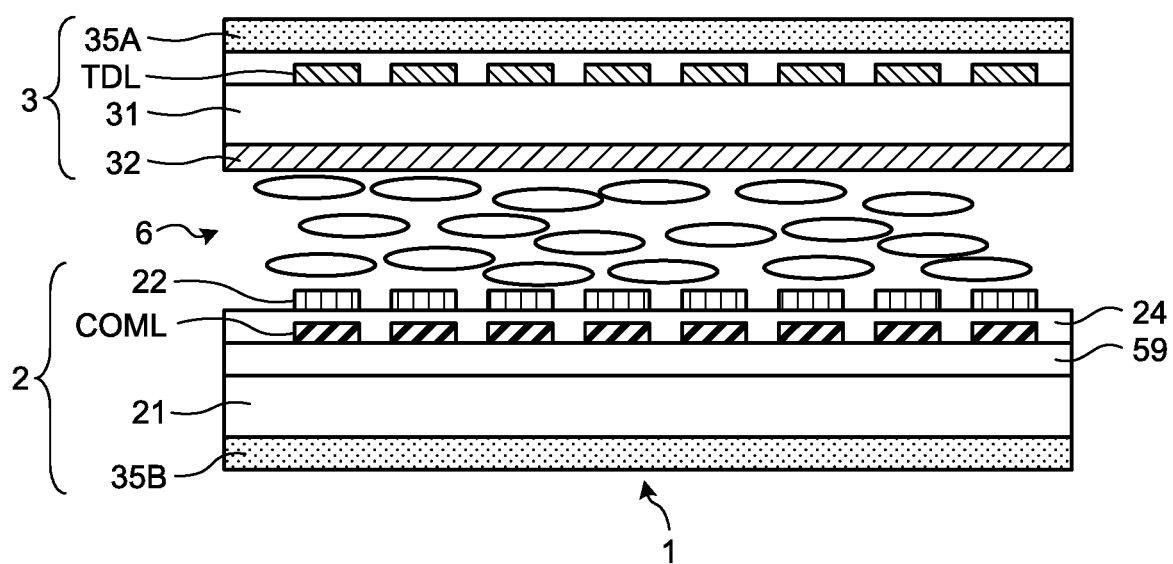
FIG. 12 is a sectional view illustrating a schematic sectional structure of the detection device and the display device according to the first embodiment.

The following describes an exemplary configuration of the display device 1 according to the present embodiment in greater detail. FIG. 12 is a sectional view illustrating a schematic sectional structure of the detection device and the display device according to the first embodiment. As illustrated in FIG. 12, the display panel 10 includes a pixel substrate 2, a counter substrate 3, and a liquid crystal layer 6 serving as a display functional layer. The counter substrate 3 faces the pixel substrate 2 in a direction perpendicular to the surface of the pixel substrate 2. The liquid crystal layer 6 is interposed between the pixel substrate 2 and the counter substrate 3.

The pixel substrate 2 includes a first substrate 21, pixel electrodes 22, the first electrodes COML, a polarizing plate 35B, and an insulating layer 59. The first substrate 21 is provided with circuits, such as a gate scanner included in the gate driver 12, switching elements, such as thin-film transistors (TFT), and various kinds of wiring (not illustrated in FIG. 12), such as gate lines GCL and signal lines SGL.

The pixel electrodes 22 are provided on the first electrodes COML with an insulating layer 24 interposed therebetween. The pixel electrodes 22 are disposed in a matrix (row-column configuration) in planar view. The polarizing plate 35B is provided below the first substrate 21.

In the present disclosure, an "upper side" indicates a direction from the first substrate 21 toward a second substrate 31 in a direction perpendicular to the first substrate 21, and a "lower side" indicates a direction from the second substrate 31 toward the first substrate 21. The "planar view" indicates a view seen from the direction perpendicular to the surface of the first substrate 21.

Figure 14:
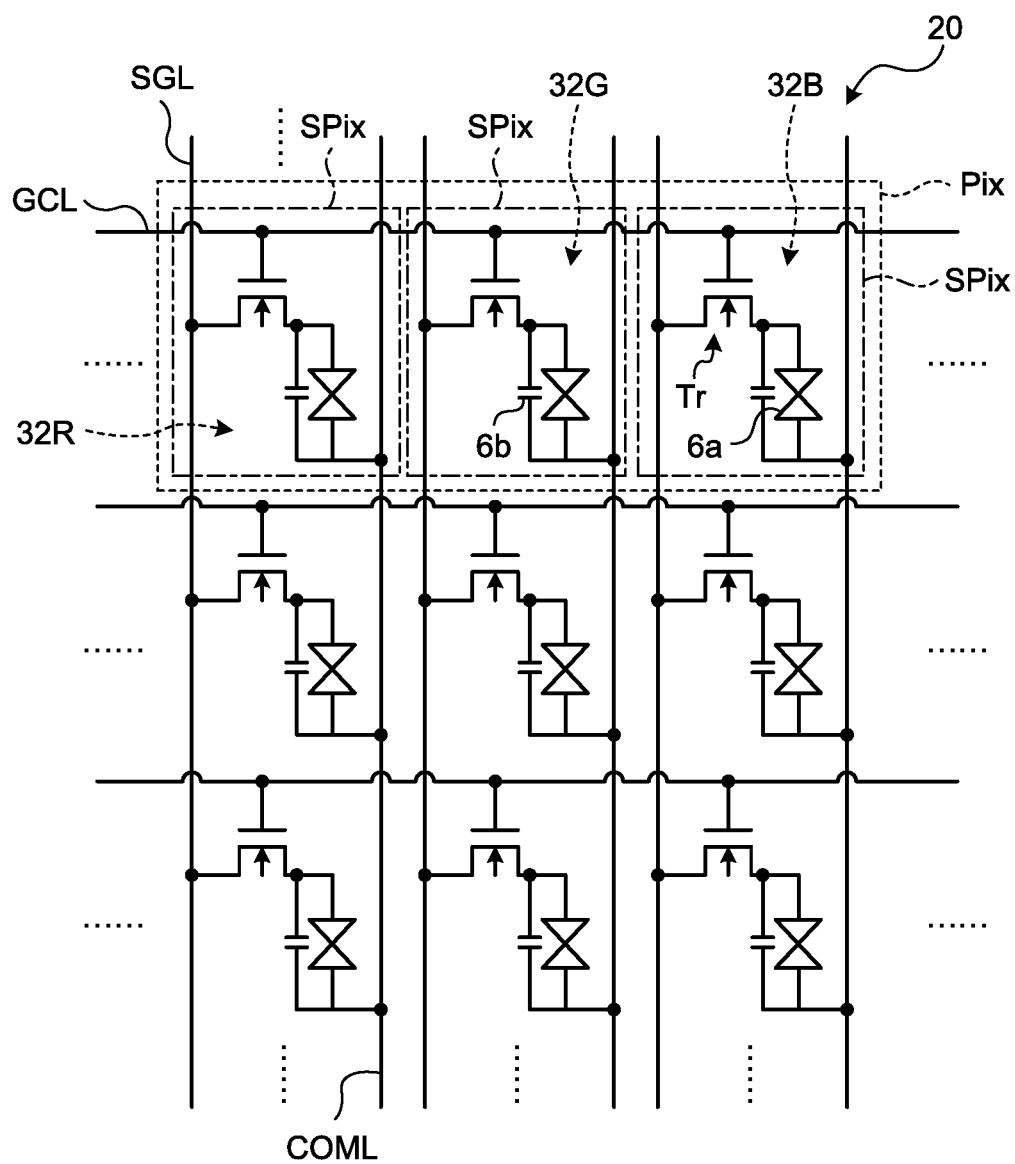
FIG. 14 is a circuit diagram illustrating a pixel array in a display region according to the present embodiment.

The pixel electrodes 22 correspond to the respective sub-pixels SPix constituting each pixel Pix of the display panel 10 (refer to FIG. 14). The pixel electrodes 22 are supplied with the pixel signals Vpix for performing a display operation. In the display operation, the first electrodes COML are supplied with the direct-current (DC) drive signals Vcomdc for display to serve as common electrodes for the pixel electrodes 22.

The pixel electrodes 22 and the first electrodes COML according to the present embodiment are made of a translucent conductive material, such as indium tin oxide (ITO).

The counter substrate 3 includes the second substrate 31, a color filter 32, the second electrodes TDL, and a polarizing plate 35A. The color filter 32 is provided on one surface of the second substrate 31. The second electrodes TDL are provided on the other surface of the second substrate 31. The second electrodes TDL are arrayed on the second substrate 31. The second electrodes TDL serve not only as detection electrodes in mutual capacitance detection but also as detection electrodes in self-capacitance hover detection. The display device 1 includes the display panel 10 including the sensor region 30 serving as the detection device that detects a target object in the sensor region 30 and the display region 20. The second electrodes TDL are provided in a region overlapping the display region.

The color filter 32 faces the liquid crystal layer 6 in the direction perpendicular to the first substrate 21. The color filter 32 may be disposed on the first substrate 21. The first substrate 21 and the second substrate 31 according to the present embodiment are glass substrates or resin substrates, for example.

The first substrate 21 and the second substrate 31 face each other with a predetermined space interposed therebetween. The liquid crystal layer 6 is provided between the first substrate 21 and the second substrate 31. The liquid crystal layer 6 modulates light passing therethrough depending on the state of an electric field. The liquid crystal layer 6, for example, includes liquid crystal in a lateral electric-field mode, such as an in-plane switching (IPS) mode including a fringe field switching (FFS) mode. An orientation film (not illustrated in FIG. 12) is provided between the liquid crystal layer 6 and the pixel substrate 2, and between the liquid crystal layer 6 and the counter substrate 3 illustrated in FIG. 12.

An illumination device (backlight), which is not illustrated, is provided under the first substrate 21. The illumination device includes a light source, such as a light emitting diode (LED), and outputs light from the light source to the first substrate 21. The light from the illumination device passes through the pixel substrate 2 and is modulated depending on the state of liquid crystal at a corresponding position. The state of light transmission to the display surface varies depending on the positions. With this mechanism, an image is displayed on the display surface.

Figure 13:
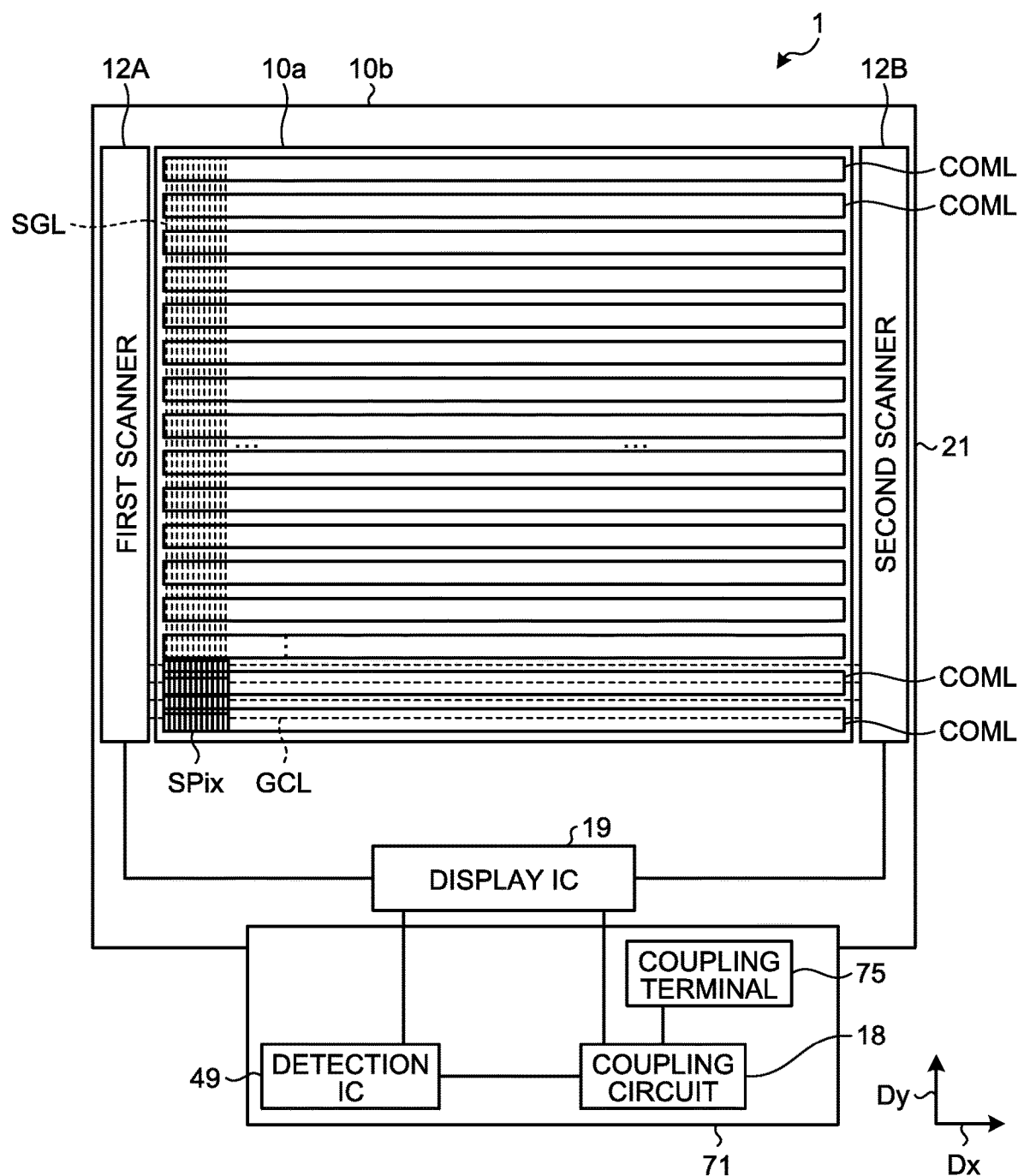
FIG. 13 is a plan view schematically illustrating a first substrate.

FIG. 13 is a plan view schematically illustrating the first substrate. As illustrated in FIG. 13, the display device 1 has a peripheral region 10b outside an active area 10a. In the present disclosure, the active area 10a is an area for displaying an image and overlapping a plurality of pixels Pix (sub-pixels SPix). The peripheral region 10b is a region inside the outer periphery of the first substrate 21 and outside the active area 10a. The peripheral region 10b may have a frame shape surrounding the active area 10a. In this case, the peripheral region 10b may also be referred to as a frame region.

A first direction Dx according to the present embodiment extends along the long side of the active area 10a. A second direction Dy is orthogonal to the first direction Dx. The directions Dx and Dy are not limited thereto, and the second direction Dy may intersect the first direction Dx at an angle other than 90 degrees. The plane defined by the first direction Dx and the second direction Dy is parallel to the surface of the first substrate 21. The direction orthogonal to the first direction Dx and the second direction Dy is the thickness direction of the first substrate 21.

As illustrated in FIG. 13, the first electrodes COML extend in the first direction Dx and are arrayed in the second direction Dy in the active area 10a. In other words, the first electrodes COML extend along the long side of the active area 10a and are arrayed along the short side thereof.

A plurality of sub-pixels SPix are disposed in a matrix (row-column configuration) at a position corresponding to one first electrode COML. The sub-pixel SPix has an area smaller than that of the first electrode COML. The signal lines SGL and the gate lines GCL are provided in a corresponding manner to the respective sub-pixels SPix. The signal lines SGL extend in the second direction Dy and are arrayed in the first direction Dx. The gate lines GCL intersect the signal lines SGL in planar view, extend in the first direction Dx, and are arrayed in the second direction Dy. While FIG. 13 illustrates part of the sub-pixels SPix, the signal lines SGL, and the gate lines GCL, they are disposed across the entire active area 10a.

The first electrodes COML according to the present embodiment extend in a direction parallel to the extending direction of the gate lines GCL and in a direction intersecting the signal lines SGL in planar view.

The pixel electrodes 22 are not necessarily arrayed in the first direction Dx and the second direction Dy intersecting the first direction Dx, that is, in a matrix (row-column configuration). Alternatively, a configuration may be employed in which the pixel electrodes 22 adjacent to each other are shifted in the first direction Dx or the second direction Dy. Still alternatively, a configuration may be employed in which the pixel electrodes 22 adjacent to each other have different sizes, and two or three pixel electrodes 22 are disposed on one side of one pixel electrode 22 included in a pixel column arrayed in the first direction Dx.

A first scanner 12A and a second scanner 12B are provided in the peripheral region 10b. The drive circuit 14 (refer to FIG. 1) is coupled to the first electrodes COML via the first scanner 12A and the second scanner 12B. The first electrodes COML are sandwiched between the first scanner 12A and the second scanner 12B.

The coupling circuit 18, a coupling terminal 75, and a display integrated circuit (IC) 19 are provided on a long side of the peripheral region 10b. A flexible substrate 71 is coupled to the long side of the peripheral region 10b. The flexible substrate 71 is provided with a detection IC 49. The display IC 19 serves as the control circuit 11 illustrated in FIG. 1. Part of the functions of the detection circuit 40 may be included in the detection IC 49 or provided as functions of an external micro-processing unit (MPU). The configuration of the display IC 19 or the detection IC 49 is not limited thereto, and the display IC 19 or the detection IC 49 may be provided to an external control substrate outside the module, for example.

The first electrodes COML are electrically coupled to the display IC 19.

The following describes a display operation performed by the display panel 10. FIG. 14 is a circuit diagram illustrating a pixel array in the display region according to the present embodiment. The first substrate 21 (refer to FIG. 12) is provided with switching elements Tr of the respective sub-pixels SPix, the signal lines SGL, the gate lines GCL, and other components as illustrated in FIG. 14. The signal lines SGL are wiring that supplies the pixel signals Vpix to the pixel electrodes 22. The gate lines GCL are wiring that supplies drive signals for driving the switching elements Tr. The signal lines SGL and the gate lines GCL extend on a plane parallel to the surface of the first substrate 21.

The display region 20 illustrated in FIG. 14 includes the sub-pixels SPix arrayed in a matrix (row-column configuration). The sub-pixels SPix each include the switching element Tr and a liquid crystal element 6a. The switching element Tr is a thin-film transistor and is an n-channel metal oxide semiconductor (MOS) TFT in this example. The insulating layer 24 is provided between the pixel electrodes 22 and the first electrodes COML to form a holding capacitance 6b illustrated in FIG. 14.

The gate driver 12 illustrated in FIG. 1 sequentially selects a gate line GCL. The gate driver 12 applies the scanning signals Vscan to the gates of the switching elements Tr of the respective sub-pixels SPix via the selected gate line GCL. As a result, one row (one horizontal line) of sub-pixels SPix out of the sub-pixels SPix is sequentially selected as a target of display drive. The source driver 13 supplies the pixel signals Vpix to the sub-pixels SPix included in the selected horizontal line via the signal lines SGL. The sub-pixels SPix perform display on a one horizontal line-by-one horizontal line basis in accordance with the supplied pixel signals Vpix.

To perform the display operation, the drive circuit 14 applies the drive signals Vcomdc for display to the first electrodes COML. The drive signal Vcomdc for display is a voltage signal serving as a common potential for the sub-pixels SPix. As a result, the first electrodes COML serve as common electrodes for the pixel electrodes 22 in the display operation. To perform display, the drive circuit 14 applies the drive signals Vcomdc to all the first electrodes COML in the active area 10a.

The color filter 32 illustrated in FIG. 12 may include periodically arrayed color areas in three colors of red (R), green (G), and blue (B), for example. The color areas 32R, 32G, and 32B in the respective three colors of R, G, and B, which serve as a set, correspond to the respective sub-pixels SPix illustrated in FIG. 14. A set of sub-pixels SPix corresponding to the respective color areas 32R, 32G, and 32B in the three colors constitutes one pixel Pix. The color filter 32 may include color areas in four or more colors.

Figure 15:
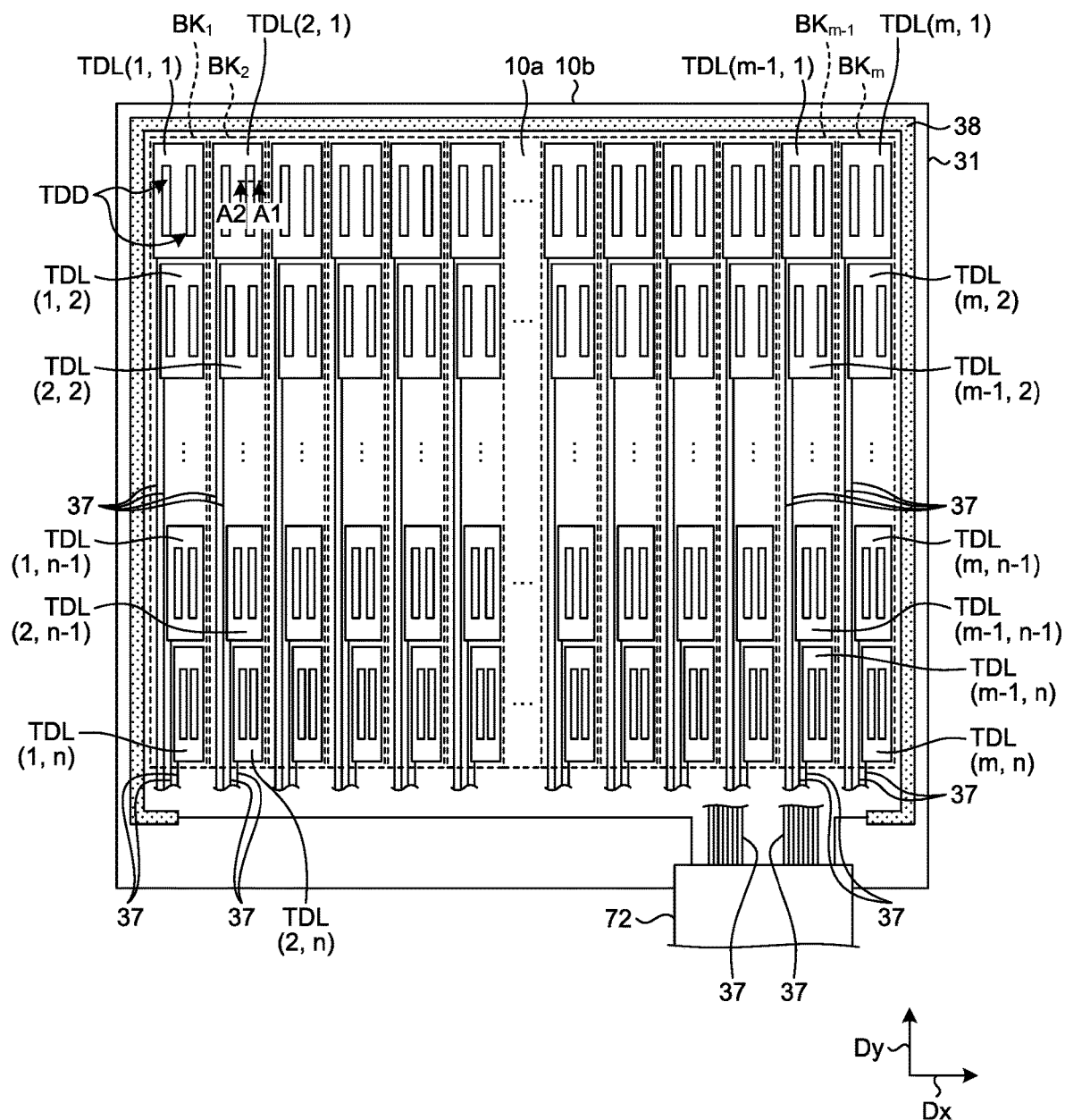
FIG. 15 is a plan view schematically illustrating a second substrate.
Figure 16:
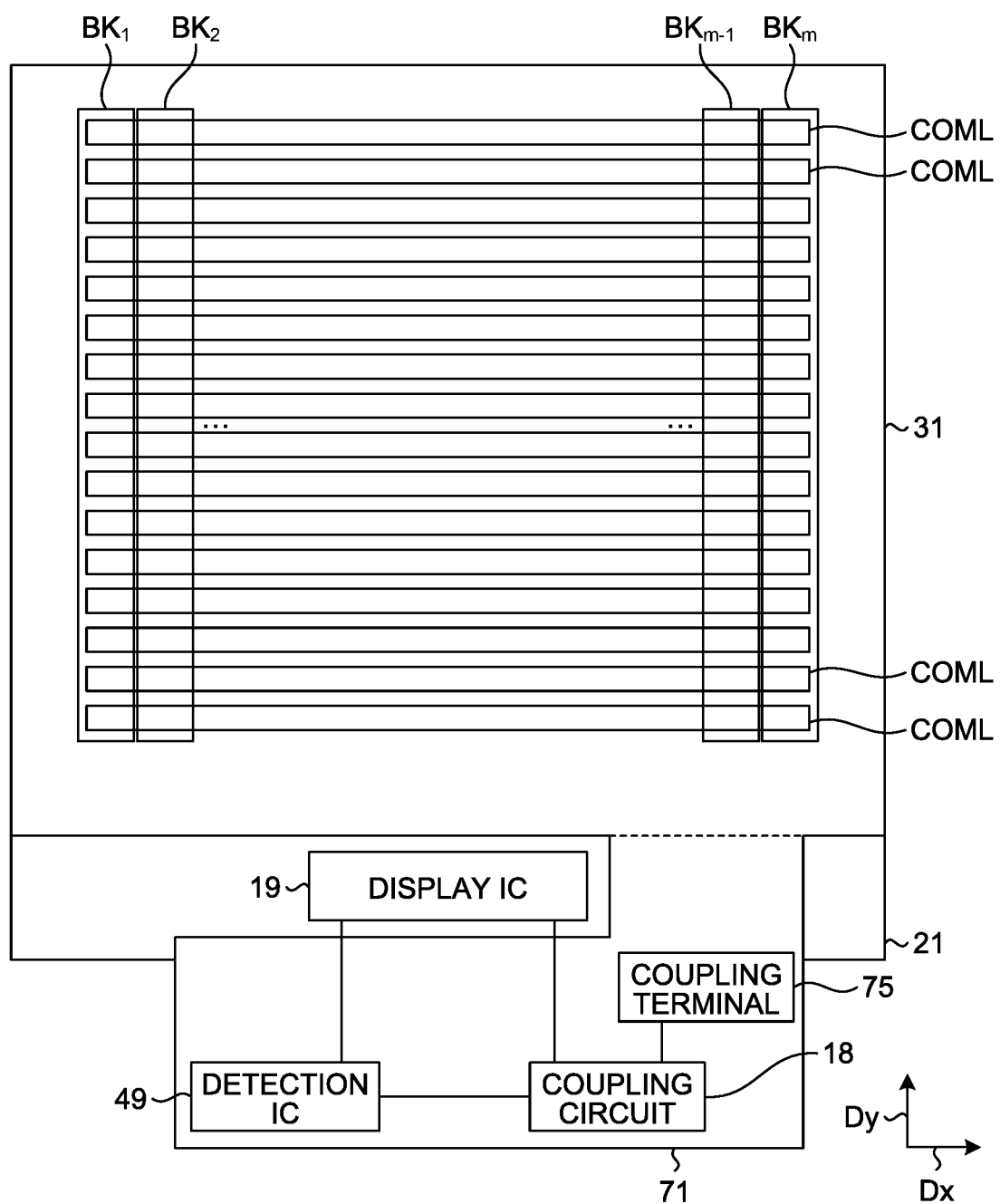
FIG. 16 is a schematic diagram for explaining a relation between detection electrode blocks and first electrodes.

The following describes a configuration of the second electrodes TDL. FIG. 15 is a plan view schematically illustrating the second substrate. FIG. 16 is a schematic diagram for explaining a relation between detection electrode blocks and the first electrodes. As illustrated in FIG. 15, the second electrodes TDL are arrayed in a matrix (row-column configuration) in the active area 10a of the second substrate 31. Second electrodes TDL(1, 1), TDL(1, 2), . . . , and TDL(1, n) are arrayed in the second direction Dy, for example. Second electrodes TDL(1, 1), TDL(2, 1), . . . , and TDL(m, 1) are arrayed in the first direction Dx. The second electrodes TDL(1, 1), TDL(1, 2), . . . , TDL(1, n), TDL(2, 1), . . . , and TDL(m, 1) are simply referred to as the second electrodes TDL when they need not be distinguished from one another.

The second electrodes TDL are made of a translucent conductive material, such as ITO. The second electrodes TDL are not necessarily made of ITO and may include metal thin wires made of a metal material like a second embodiment of the present disclosure, which will be described later, for example.

Conductive outer edge wires 38 called a guard ring and a flexible substrate 72 are provided in the peripheral region 10b of the second substrate 31. The outer edge wires 38 surround the second electrodes TDL. The second electrodes TDL are disposed inside the outer edge wires 38. Both ends of the outer edge wires 38 are electrically coupled to the flexible substrate 72.

The second electrodes TDL are coupled to the flexible substrate 72 via respective coupling wires 37. The flexible substrate 72 is coupled to the coupling terminal 75 of the first substrate 21 illustrated in FIG. 13. Accordingly, the second electrodes TDL are electrically coupled to the coupling circuit 18 via the respective coupling wires 37, the flexible substrate 72, and the coupling terminal 75.

The coupling circuit 18 switches a coupling state of the second electrodes TDL between touch detection and hover detection. The following describes the coupling state of the second electrodes TDL in touch detection with reference to FIG. 15. As illustrated in FIG. 15, in touch detection, the coupling circuit 18 according to the present embodiment electrically couples a plurality of second electrodes TDL arrayed in the second direction Dy to one another, in accordance with the control signals supplied from the control circuit 11. Detection electrode blocks $BK_1$, $BK_2$, . . . , $BK_{m-1}$, and $BK_m$ each include a plurality of second electrodes TDL arrayed in the second direction Dy. In the detection electrode block $BK_1$, for example, the second electrodes TDL(1, 1), TDL(1, 2), . . . , and TDL(1, n) are electrically coupled to one another so that the detection electrode block $BK_1$ serves as one detection electrode. In other words, one detection electrode block BK serves as one detection electrode including a plurality of second electrodes TDL arrayed in a certain column. In the present disclosure, the detection electrode blocks $BK_1$, $BK_2$, . . . , $BK_{m-1}$, and $BK_m$ are simply referred to as the detection electrode blocks BK when they need not be distinguished from one another. The configuration of the coupling circuit 18 will be described later.

As illustrated in FIG. 16, the detection electrode blocks BK extend in the second direction Dy and are arrayed in the first direction Dx. The detection electrode blocks BK intersect the first electrodes COML in planar view. An array pitch of the detection electrode blocks BK in the first direction Dx is equal to that of the second electrodes TDL in the first direction Dx. At the intersections of the detection electrode blocks BK and the first electrodes COML, capacitance is formed between the second electrodes TDL included in the detection electrode blocks BK and the first electrodes COML.

In touch detection, the drive circuit 14 (refer to FIG. 1) supplies the first drive signals Vcom1 to the first electrodes COML via the first scanner 12A and the second scanner 12B. The detection electrode blocks BK output, to the detection circuit 40 via the coupling circuit 18, the first detection signals Vdet1 corresponding to changes in capacitance between the detection electrode blocks BK and the first electrodes COML. The detection circuit 40 performs detection by the mutual capacitance method described above in accordance with the first detection signals Vdet1, thereby detecting touch input. The drive circuit 14 sequentially drives the first electrodes COML in the active area 10a to perform touch detection. As described above, the first electrodes COML serve as drive electrodes in mutual capacitance touch detection. The coordinate extraction circuit 45 thus can detect the position of the target object in the contact state.

As described above, the detection electrode block BK including a plurality of second electrodes TDL serves as one detection electrode in mutual capacitance touch detection. The second electrode TDL as a whole has a substantially rectangular outer shape, in which a length in the second direction Dy is longer than that in the first direction Dx, i.e., the longitudinal direction of the second electrode TDL is the second direction Dy. Accordingly, a width of one detection electrode block BK in the first direction Dx is smaller than that in the second direction Dy. This structure increases sensitivity in mutual capacitance detection.

In touch detection, the first electrodes COML (refer to FIG. 13) not supplied with the first drive signals Vcom1 may be in a floating state where no voltage signal is supplied thereto and their electric potential is not fixed. Alternatively, the drive circuit 14 may supply voltage signals having a fixed electric potential to the first electrodes COML not supplied with the first drive signals Vcom1.

In touch detection, the outer edge wires 38 are in a floating state where no voltage signal is supplied thereto and its electric potential is not fixed. Alternatively, the drive circuit 14 may supply DC voltage signals having a fixed electric potential to the outer edge wires 38. This mechanism can reduce parasitic capacitance in the second electrodes TDL, thereby increasing detection accuracy.

Figure 17:
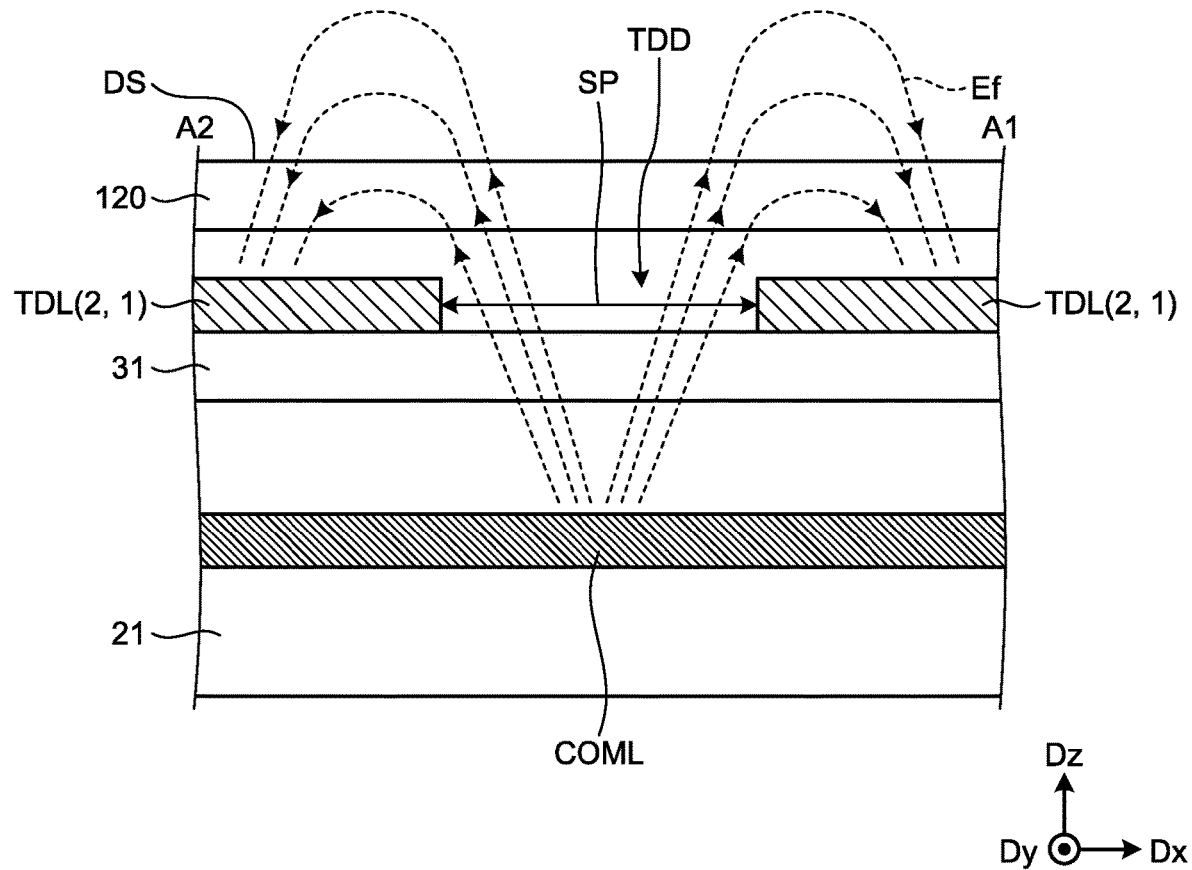
FIG. 17 is an explanatory diagram schematically illustrating lines of electric force of a fringe electric field generated between the first electrode and a second electrode in touch detection.

FIG. 17 is an explanatory diagram schematically illustrating lines of electric force of a fringe electric field generated between the first electrode and the second electrode in touch detection. FIG. 17 is a sectional view along line A1-A2 in FIG. 15.

As illustrated in FIG. 17, the second electrode TDL provided to the second substrate 31 is on the upper side than the first electrode COML provided to the first substrate 21. As described above, the second electrode TDL serves as a detection electrode in mutual capacitance detection. As illustrated in FIG. 17, when the first drive signals Vcom1 are supplied to the first electrode COML in touch detection, lines of electric force Ef of a fringe electric field are generated between the first electrode COML and the second electrode TDL. The lines of electric force Ef of the fringe electric field extend from the first electrode COML toward the upper side of a display surface DS, while passing through an electric-field transmission region TDD in the second electrode TDL facing the first electrode COML. In FIG. 17, the display surface DS serves as the surface of a cover glass 120. The display surface DS is not limited thereto and may be the surface of another member provided at the uppermost part of the display device 1 or the surface of a protective layer provided to the second substrate 31.

Increasing the area of the second electrode TDL in planar view can increase detection sensitivity in hover detection. If the area of the second electrode TDL in planar view is increased, however, the second electrode TDL facing the first electrode COML blocks the fringe electric field. This may reduce the number of lines of electric force Ef of the fringe electric field passing through the second electrode TDL, thereby decreasing detection sensitivity in touch detection.

As illustrated in FIG. 15, one second electrode TDL has two electric-field transmission regions TDD in planar view. As illustrated in FIG. 15, the electric-field transmission regions TDD are arrayed in the first direction Dx in one second electrode TDL. This structure increases the area of the electric-field transmission regions TDD in one second electrode TDL, thereby increasing the area of the electric-field transmission regions TDD overlapping the first electrode COML in planar view. Accordingly, the detection device can desirably perform touch detection in the sensor region 30.

The electric-field transmission regions TDD according to the first embodiment are not provided with the conductive material of the second electrodes TDL. The electric-field transmission regions TDD may be provided with dummy electrodes not serving as detection electrodes. The dummy electrodes are made of a conductive material the electric potential of which is not fixed, for example. The conductive material may be a translucent conductive material, such as ITO.

The electric-field transmission region TDD as a whole has a substantially rectangular outer shape, in which a length in the second direction Dy is longer than that in the first direction Dx, i.e., the longitudinal direction of the electric-field transmission region TDD is the second direction Dy. As illustrated in FIG. 17, the electric-field transmission regions TDD overlap the respective first electrodes COML arrayed in the second direction Dy in planar view.

To detect the target object that is positioned substantially 5 cm above the display surface DS, for example, the length of the second electrode TDL in the first direction Dx is from 10 mm to 30 mm inclusive, for example, and the length thereof in the second direction Dy is from 10 mm to 30 mm inclusive. A width SP of the electric-field transmission region TDD in the first direction Dx is set according to a distance between the first electrode COML and the second electrode TDL, and is from 0.5 mm to 2 mm inclusive, for example. When the first drive signals Vcom1 are sequentially supplied to the first electrodes COML, a fringe electric field extends from the first electrodes COML through the electric-field transmission regions TDD. The fringe electric field can extend from the first electrode COML toward the upper side of display surface DS like the lines of electric force Ef illustrated in FIG. 17. Accordingly, the detection device can desirably perform touch detection.

Figure 18:
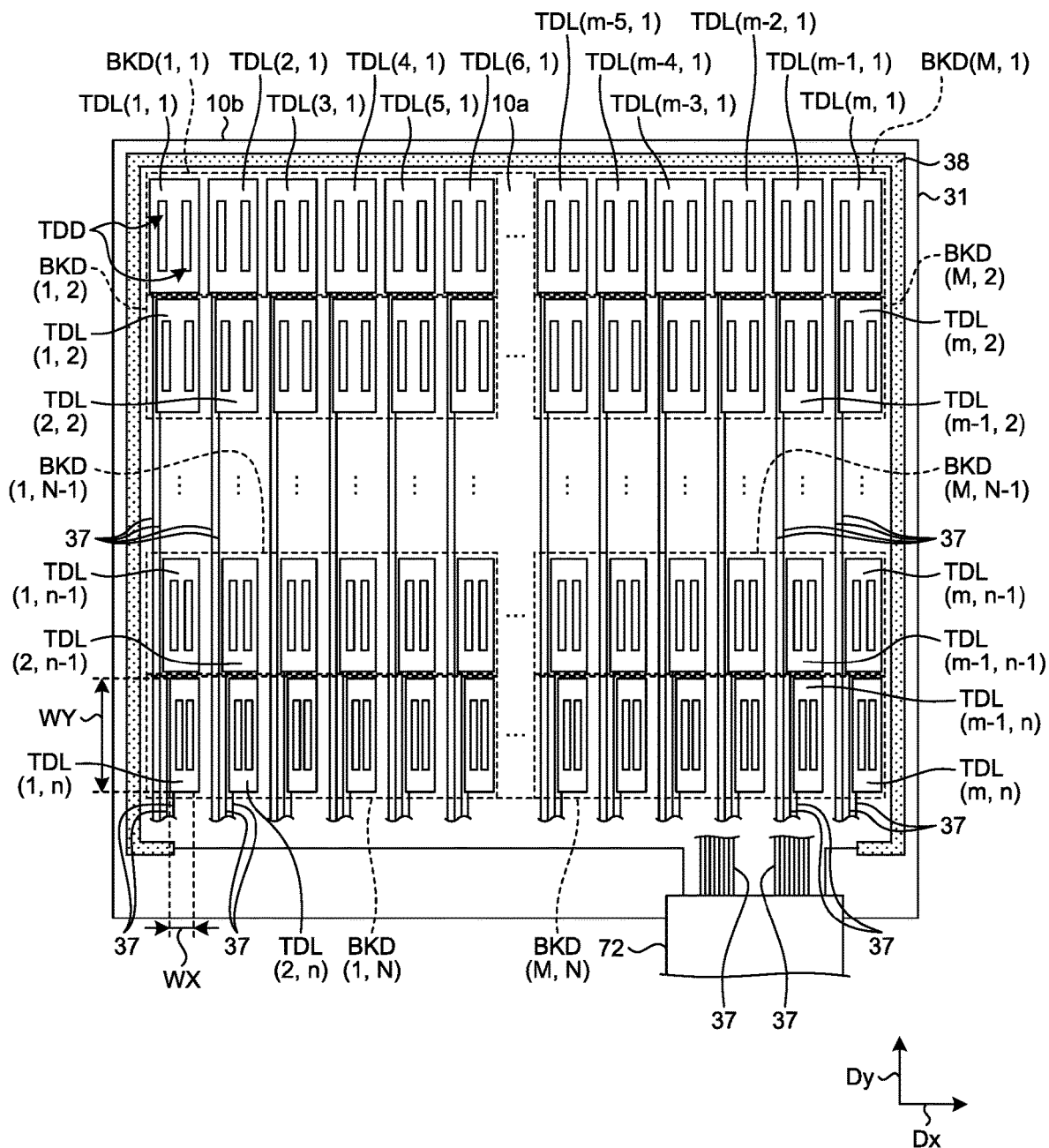
FIG. 18 is a plan view schematically illustrating the second substrate.

In hover detection, the coupling circuit 18 electrically couples a plurality of second electrodes TDL disposed side by side in the first direction Dx for each predetermined area in accordance with the control signals supplied from the control circuit 11. FIG. 18 is a plan view schematically illustrating the second substrate. The following describes the coupling state of the second electrodes TDL in hover detection with reference to FIG. 18. FIG. 18 illustrates detection electrode blocks BKD(1, 1), BKD(1, 2), BKD(1, N−1), BKD(1, N), BKD(M, 1), BKD(M, 2), BKD(M, N−1), and BKD(M, N), for example. In the present disclosure, the detection electrode blocks BKD(1, 1), . . . , and BKD(M, N) are simply referred to as the detection electrode blocks BKD when they need not be distinguished from one another. While FIG. 18 illustrates part of the detection electrode blocks BKD, the detection electrode blocks BKD are arrayed in a matrix (row-column configuration) in the active area 10a. In other words, the detection electrode blocks BKD are arrayed in the first direction Dx and the second direction Dy.

In each of the detection electrode blocks BKD, one second electrode TDL in the second direction Dy and six second electrodes TDL in the first direction Dx, that is, six second electrodes TDL in one row and six columns are coupled. In the detection electrode block BKD(1, 1), for example, the second electrodes TDL(1, 1), TDL(2, 1), TDL(3, 1), TDL(4, 1), TDL(5, 1), and TDL(6, 1) are electrically coupled to one another so that the detection electrode block BKD(1, 1) serves as one detection electrode. This configuration increases the area of the detection electrode block BKD, thereby increasing detection sensitivity in hover detection.

Similarly, in the detection electrode block BKD(M, 1), the second electrodes TDL(m−5, 1), TDL(m−4, 1), TDL(m−3, 1), TDL(m−2, 1), TDL(m−1, 1), and TDL(m, 1) are electrically coupled to one another so that the detection electrode block BKD(M, 1) serves as one detection electrode. Explanation of the detection electrode blocks BKD(1, 2), BKD(1, N−1), BKD(1, N), BKD(M, 2), BKD(M, N−1), and BKD (M, N) is omitted.

The area of the detection electrode block BKD, i.e., the area of a plurality of second electrodes TDL that are disposed side by side in the first direction Dx and are electrically coupled to one another for each predetermined area, is larger than the area of one second electrode TDL. The second electrode TDL as a whole has a substantially rectangular outer shape, in which a size WY in the second direction Dy is longer than a size WX in the first direction Dx, i.e., the longitudinal direction of the second electrode TDL is the second direction Dy. Electrically coupling a plurality of second electrodes TDL disposed side by side in the first direction Dx to one another for each predetermined area more easily increases the area of the detection electrode block BKD than the case of electrically coupling a plurality of second electrodes TDL disposed side by side in the second direction Dy to one another for each predetermined area. With this configuration, the area of the detection electrode block BKD increases, thereby increasing detection sensitivity in hover detection.

In the detection electrode block BKD according to the present disclosure, six second electrodes TDL disposed side by side in the first direction Dx are electrically coupled to one another so that the detection electrode block BKD serves as one detection electrode. The detection electrode block BKD may include two or more second electrodes TDL disposed side by side in the first direction Dx and two or more second electrodes TDL disposed side by side in the second direction Dy. Alternatively, the detection electrode block BKD may include three or more second electrodes TDL disposed side by side in the first direction Dx and three or more second electrodes TDL disposed side by side in the second direction Dy. All the second electrodes TDL in the active area 10a, for example, may be electrically coupled to one another to serve as one detection electrode block BKD.

As described above, in touch detection (mutual capacitance method), the second electrodes TDL are collectively driven as the detection electrode blocks BK. In hover detection (self-capacitance method), the second electrodes TDL serve as the detection electrode blocks BKD.

In hover detection, the drive circuit 14 (refer to FIG. 1) sequentially or simultaneously supplies the second drive signals Vself to the detection electrode blocks BKD via the coupling circuit 18. In other words, the drive circuit 14 collectively drives the second electrodes TDL included in each of the detection electrode blocks BKD. The detection electrode blocks BKD output, to the detection circuit 40 via the coupling circuit 18, the second detection signals Vdet2 corresponding to capacitance changes in the second electrodes TDL included in the detection electrode blocks BKD.

In accordance with the second detection signals Vdet2, the detection circuit 40 performs hover detection by the self-capacitance method described above. The detection circuit 40 can detect the position and a movement, such as a gesture, of the target object in the non-contact state in accordance with the second detection signals Vdet2 supplied from the detection electrode blocks BKD in the active area 10a.

Figure 19:
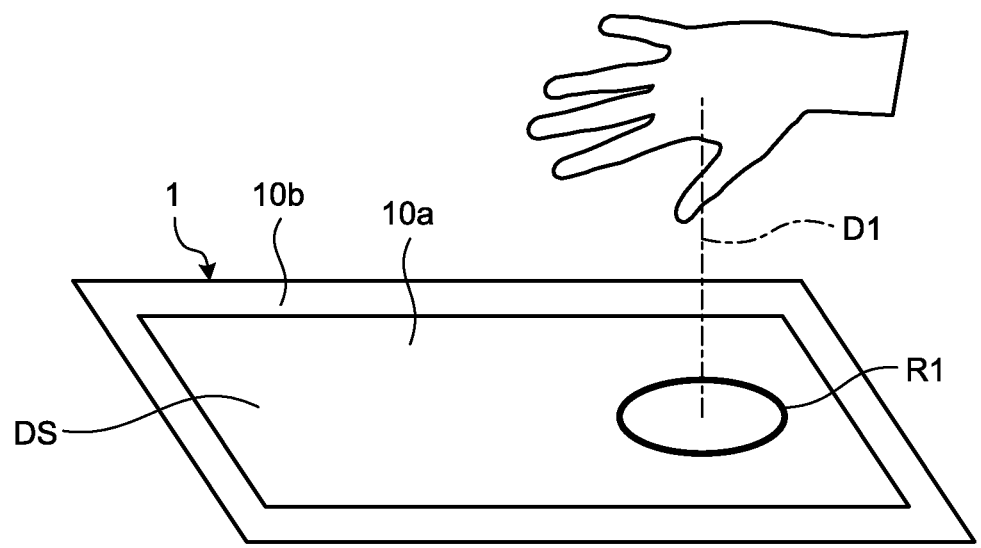
FIG. 19 is an explanatory diagram illustrating an example of hover detection according to the present embodiment.
Figure 20:
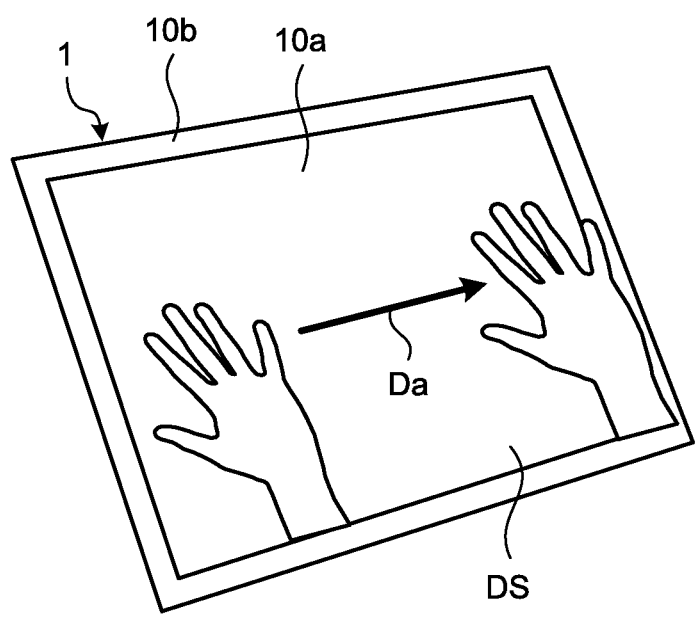
FIG. 20 is an explanatory diagram illustrating another example of hover detection according to the present embodiment.

FIG. 19 is an explanatory diagram illustrating an example of hover detection according to the present embodiment. FIG. 20 is an explanatory diagram illustrating another example of hover detection according to the present embodiment. As illustrated in FIG. 19, the display device 1 performs hover detection when a finger of an operator serving as the target object is in the non-contact state with respect to the display surface DS. The detection circuit 40 can detect a distance D1 between the display surface DS and the target object in a direction perpendicular to the display surface DS in accordance with the second detection signals Vdet2. The detection circuit 40 can also detect a position R1 of the target object in accordance with the second detection signals Vdet2. The position R1 of the target object faces the target object in the direction perpendicular to the display surface DS, for example, and corresponds to a detection electrode block BKD having the largest value of the second detection signals Vdet2 supplied from the detection electrode blocks BKD.

As illustrated in FIG. 20, the display device 1 can also detect a movement, such as a gesture, of the target object. When the target object in the non-contact state with respect to the display surface DS moves in the direction of the arrow Da, the detection circuit 40 calculates the change in position of the target object in accordance with the second detection signals Vdet2. The detection circuit 40 thus detects a movement, such as a gesture, of the target object. Based on results of hover detection, the control circuit 11 (refer to FIG. 1) performs a predetermined display operation or detection operation.

As described above, the detection electrode block BKD including a plurality of second electrodes TDL serves as one detection electrode in self-capacitance hover detection. In hover detection, the drive circuit 14 supplies guard signals Vgd to the first electrodes COML. The first electrodes COML are driven at the same electric potential as that of the second electrodes TDL. This mechanism can reduce parasitic capacitance between the second electrodes TDL and the first electrodes COML, thereby increasing detection accuracy in hover detection. In other words, the first electrodes COML serve as guard electrodes in hover detection.

In hover detection, the drive circuit 14 also supplies the guard signals Vgd to the outer edge wires 38. The guard signal Vgd is a voltage signal synchronized with the second drive signal Vself and having the same electric potential as that of the second drive signal Vself. This mechanism can reduce parasitic capacitance in the second electrodes TDL, thereby increasing detection accuracy.

As described above, the second electrodes TDL serve not only as detection electrodes in mutual capacitance touch detection but also as detection electrodes in self-capacitance hover detection. One detection electrode block BKD according to the present embodiment has an area larger than that of one second electrode TDL. With this configuration, the lines of electric force of an electric field generated from the detection electrode block BKD reach a position away from the display surface DS. Accordingly, the display device 1 can perform accurate touch detection and desirable hover detection using the second electrodes TDL both in touch detection and hover detection.

The second electrodes TDL according to the present embodiment are provided to the second substrate 31. This configuration can make a space between the second electrodes TDL and various kinds of circuits, such as the switching elements Tr, the first scanner 12A, and the second scanner 12B, and various kinds of wiring, such as the signal lines SGL and the gate lines GCL larger than that in a case where the second electrodes TDL are provided to the first substrate 21. Accordingly, the present embodiment can reduce parasitic capacitance formed between the second electrodes TDL and the various kinds of circuits and wiring, thereby accurately performing hover detection.

Figure 21:
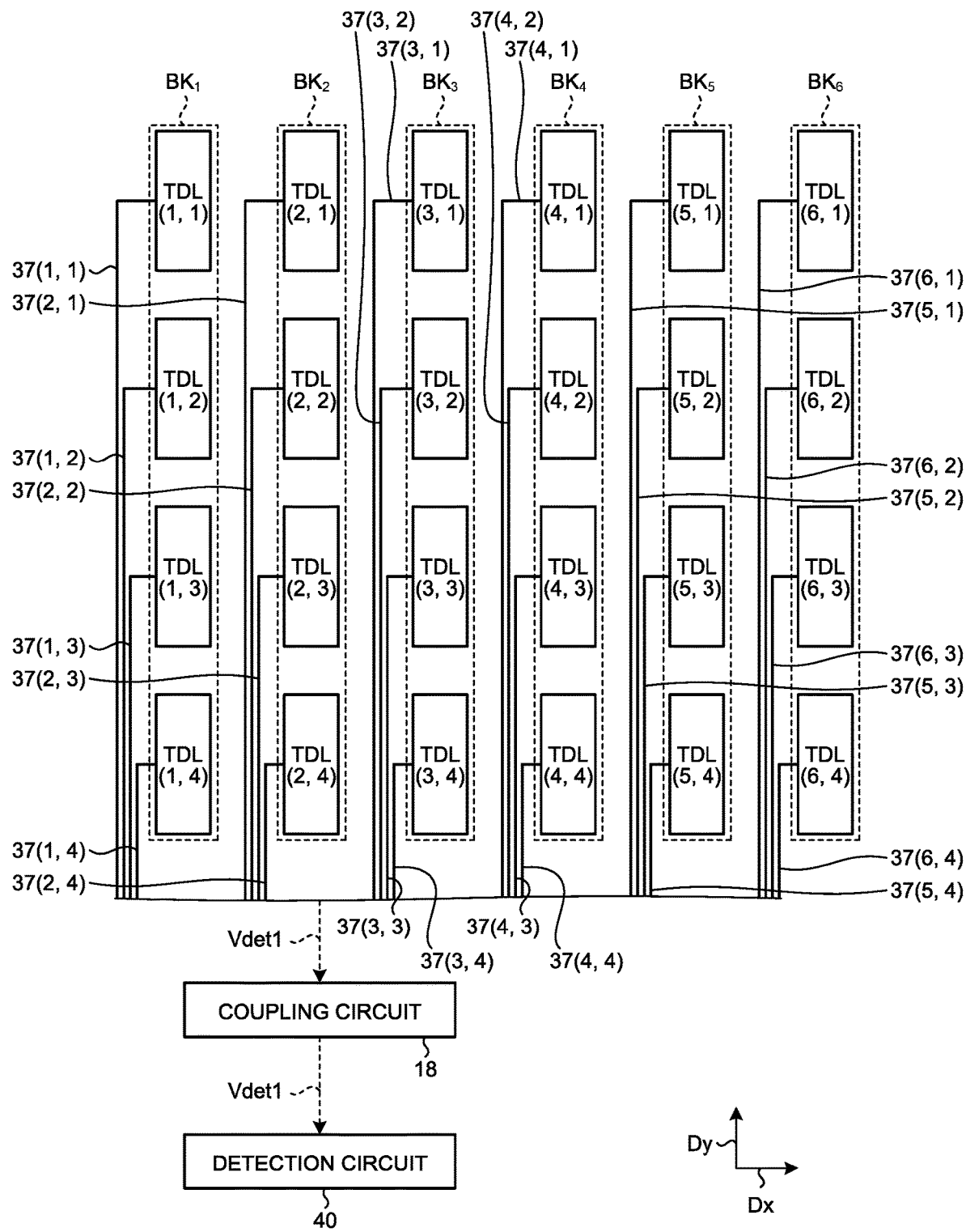
FIG. 21 is an explanatory diagram illustrating a first coupling state of the second electrodes in touch detection.
Figure 22:
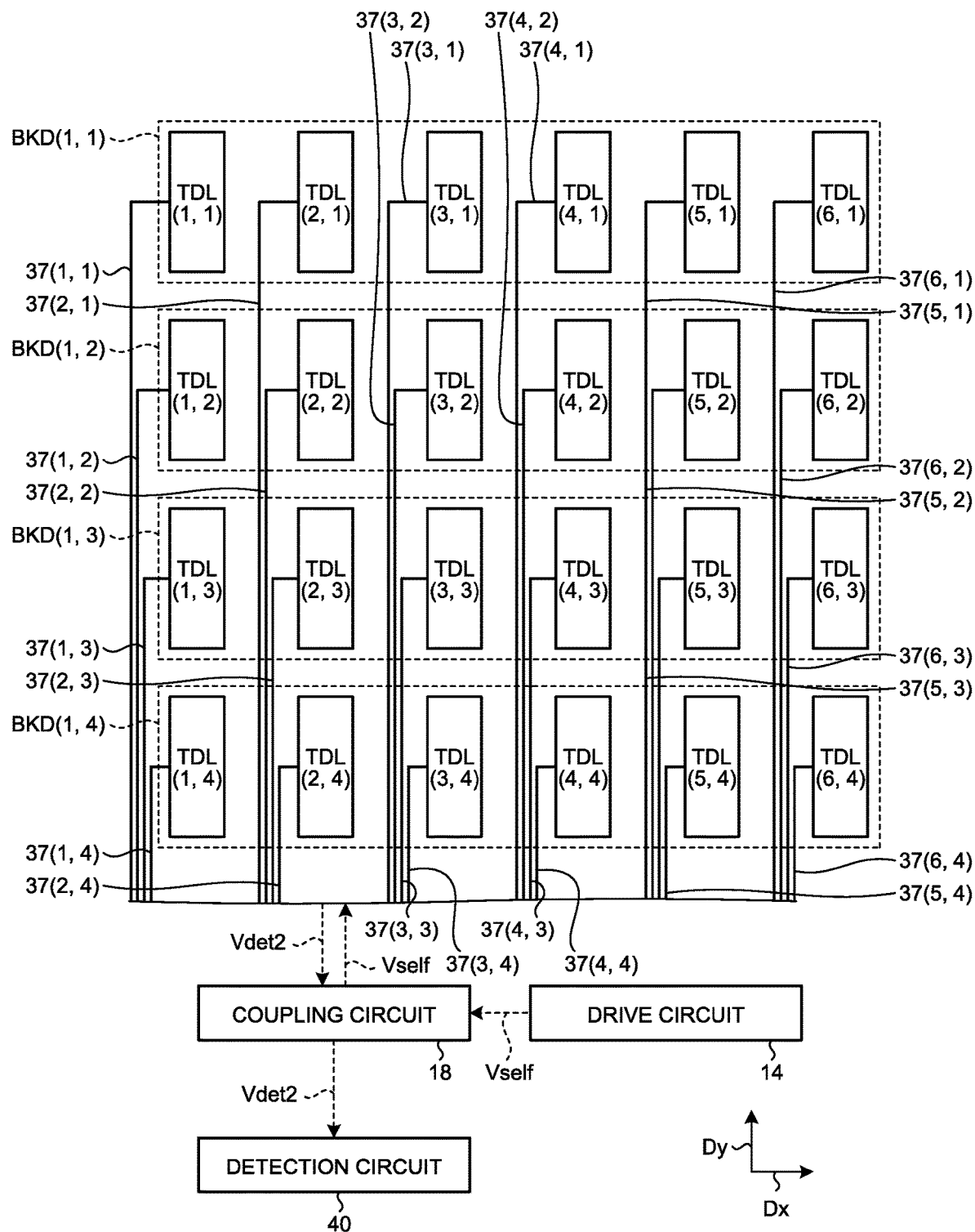
FIG. 22 is an explanatory diagram illustrating a second coupling state of the second electrodes in hover detection.
Figure 23:
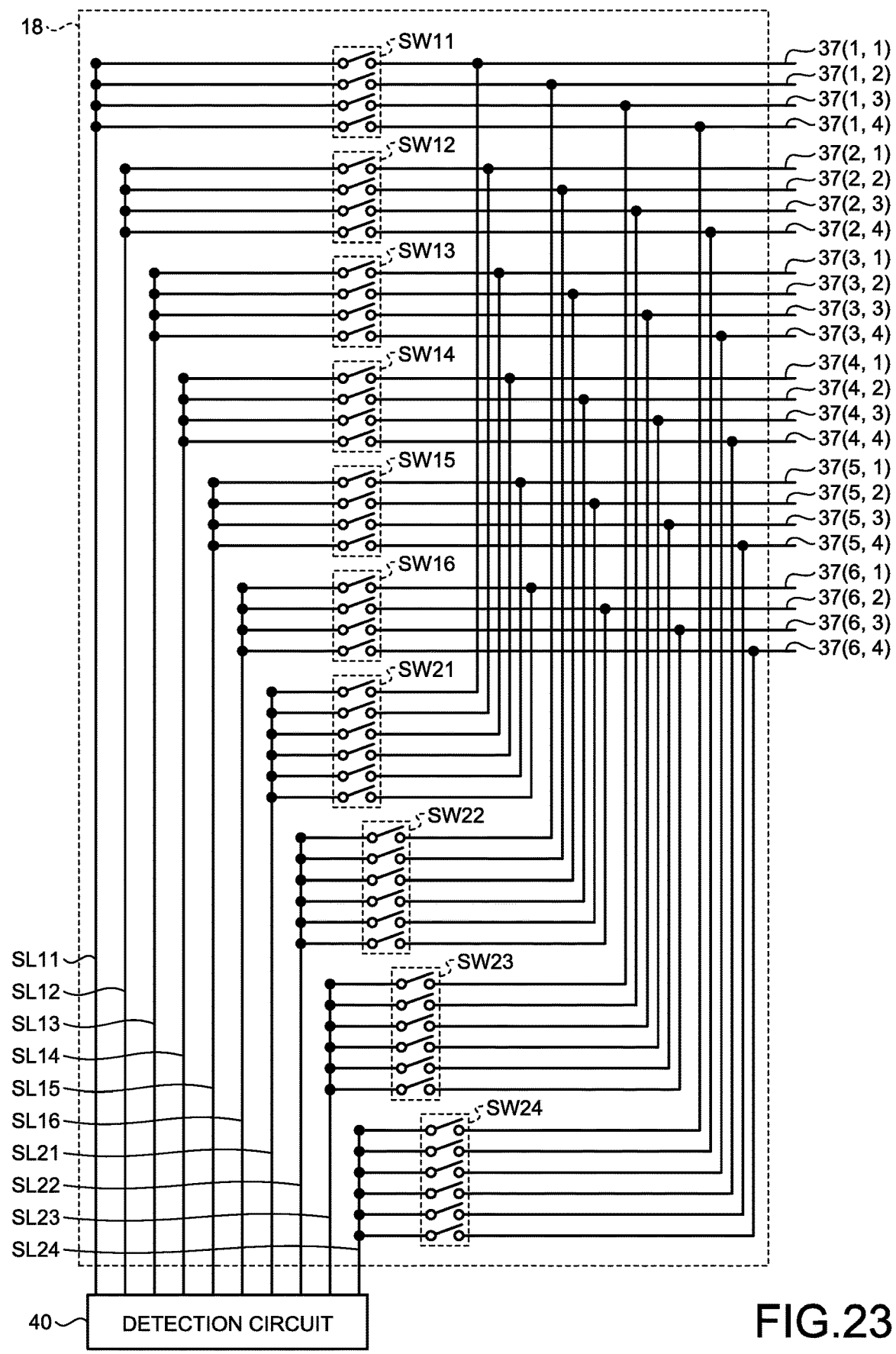
FIG. 23 is a circuit diagram illustrating an example of a coupling circuit.

The following describes an example of a coupling configuration of the coupling circuit 18. FIG. 21 is an explanatory diagram illustrating a first coupling state of the second electrodes in touch detection. FIG. 22 is an explanatory diagram illustrating a second coupling state of the second electrodes in hover detection. FIG. 23 is a circuit diagram illustrating an example of the coupling circuit. To simplify the explanation, FIGS. 21 and 22 each illustrate a configuration where the second electrodes TDL are arrayed in four rows and four columns.

As illustrated in FIGS. 21 and 22, coupling wires 37(1, 1), 37(1, 2), . . . , and 37(6, 4) coupled to the respective second electrodes TDL are coupled to the coupling circuit 18. The coupling circuit 18 changes a coupling relation of the coupling circuit 18 and the second electrodes TDL through the respective coupling wires 37 between touch detection and hover detection.

As illustrated in FIG. 21, in touch detection, the drive circuit 14 sequentially supplies the first drive signals Vcom1 to the first electrodes COML, while the coupling circuit 18 is electrically coupled to a plurality of second electrodes TDL arrayed in the second direction Dy so that detection electrode blocks BK$_1$, BK$_2$, BK$_3$, BK$_4$, BK$_5$, and BK$_6$ each serve as one detection electrode. For example, the coupling circuit 18 electrically couples the second electrodes TDL(1, 1), TDL(1, 2), TDL(1, 3), TDL(1, 4), . . . , and TDL(1, n) to one another so that these electrodes TDL serve as the detection electrode block BK$_1$. The same applies to the detection electrode blocks BK$_2$, BK$_3$, BK$_4$, BK$_5$, and BK$_6$. The coupling circuit 18 supplies the first detection signals Vdet1 from the respective detection electrode blocks BK to the detection circuit 40.

As illustrated in FIG. 22, in hover detection, the coupling circuit 18 electrically couples six second electrodes TDL arrayed in the first direction Dx to one another, whereby detection electrode blocks BKD(1, 1), BKD(1, 2), BKD(1, 3), and BKD(1, 4) each serve as one detection electrode. For example, the coupling circuit 18 electrically couples the second electrodes TDL(1, 1), TDL(2, 1), TDL(3, 1), TDL(4, 1), TDL(5, 1), and TDL(6, 1) to one another so that these electrodes TDL serve as the detection electrode block BKD (1, 1). The same applies to the detection electrode blocks BKD(1, 2), BKD(1, 3), and BKD(1, 4). The drive circuit 14 supplies the second drive signals Vself to the detection electrode blocks BKD via the coupling circuit 18. The coupling circuit 18 supplies the second detection signals Vdet2 from the respective detection electrode blocks BKD to the detection circuit 40.

As illustrated in FIG. 23, coupling wires 37(1, 1), 37(1, 2), . . . , and 37(6, 4) coupled to the respective second electrodes TDL are coupled to the coupling circuit 18. The coupling wire 37(1, 1) is coupled to the second electrode TDL(1, 1) (refer to FIGS. 21 and 22), and the coupling wire 37(1, 2) is coupled to the second electrode TDL(1, 2). Similarly, the coupling wire 37(6, 4) is coupled to the second electrode TDL(6, 4). Four coupling wires 37(1, 1), 37(1, 2), 37(1, 3), and 37(1, 4), for example, are coupled to the respective four second electrodes TDL included in the detection electrode block BK$_1$ (refer to FIG. 21). Six coupling wires 37(1, 1), 37(2, 1), 37(3, 1), 37(4, 1), 37(5, 1), and 37(6, 1) are coupled to the respective six second electrodes TDL included in the detection electrode block BKD(1, 1) (refer to FIG. 22).

The coupling circuit 18 includes first switches SW11, SW12, SW13, SW14, SW15, and SW16 and second switches SW21, SW22, SW23, and SW24. The first switches SW11 to SW16 and the second switches SW21 to SW24 are n-channel MOS TFTs, for example, and provided to the first substrate 21.

As illustrated in FIG. 21, the four coupling wires 37(1, 1), 37(1, 2), 37(1, 3), and 37(1, 4) coupled to the detection electrode block BK$_1$ are coupled to a wire SL11 via the first switches SW11. The four coupling wires 37(2, 1), 37(2, 2), 37(2, 3), and 37(2, 4) coupled to the detection electrode block BK$_2$ are coupled to a wire SL12 via the first switches SW12. The four coupling wires 37(3, 1), 37(3, 2), 37(3, 3), and 37(3, 4) coupled to the detection electrode block BK$_3$ are coupled to a wire SL13 via the first switches SW13. The four coupling wires 37(4, 1), 37(4, 2), 37(4, 3), and 37(4, 4) coupled to the detection electrode block BK$_4$ are coupled to a wire SL14 via the first switches SW14. The four coupling wires 37(5, 1), 37(5, 2), 37(5, 3), and 37(5, 4) coupled to the detection electrode block BK$_5$ are coupled to a wire SL15 via the first switches SW15. The four coupling wires 37(6, 1), 37(6, 2), 37(6, 3), and 37(6, 4) coupled to the detection electrode block BK$_6$ are coupled to a wire SL16 via the first switches SW16.

As illustrated in FIG. 22, the six coupling wires 37(1, 1), 37(2, 1), 37(3, 1), 37(4, 1), 37(5, 1), and 37(6, 1) coupled to the detection electrode block BKD(1, 1) are coupled to a wire SL21 via the second switches SW21. The six coupling wires 37(1, 2), 37(2, 2), 37(3, 2), 37(4, 2), 37(5, 2), and 37(6, 2) coupled to the detection electrode block BKD(1, 2) are coupled to a wire SL22 via the second switches SW22. The six coupling wires 37(1, 3), 37(2, 3), 37(3, 3), 37(4, 3), 37(5, 3), and 37(6, 3) coupled to the detection electrode block BKD(1, 3) are coupled to a wire SL23 via the second switches SW23. The six coupling wires 37(1, 4), 37(2, 4), 37(3, 4), 37(4, 4), 37(5, 4), and 37(6, 4) coupled to the detection electrode block BKD(1, 4) are coupled to a wire SL24 via the second switches SW24. In the following description, the wires SL11 to SL24 are referred to as wires SL when they need not be distinguished from one another.

The coupling circuit 18 switches on and off the first switches SW11 to SW16 and the second switches SW21 to SW24 in accordance with the control signals Vsc1 and Vsc2 supplied from the control circuit 11. The first switches SW11 to SW16 and the second switches SW21 to SW24 perform mutually reverse switching operations. When the first switches SW11 to SW16 are turned on, for example, the second switches SW21 to SW24 are turned off. When the first switches SW11 to SW16 are turned off, the second switches SW21 to SW24 are turned on.

In touch detection, the coupling circuit 18 turns on the first switches SW11 to SW16 and turns off the second switches SW21 to SW24. As a result, the four coupling wires 37(1, 1), 37(1, 2), 37(1, 3), and 37(1, 4) coupled to the detection electrode block $BK_1$ are coupled to the wire SL11 via the first switches SW11. Similarly, the sets of four coupling wires 37 coupled to the respective detection electrode blocks $BK_2$ to $BK_6$ are coupled to the wires SL12 to SL16 via the first switches SW12 to SW16, respectively. In touch detection, the second switches SW21 to SW24 are turned off, and the coupling wires 37 are decoupled from the wires SL21 to SL24.

As described above, in touch detection, the coupling circuit 18 couples the second electrodes TDL included in one detection electrode block BK to one wire SL. While the first drive signals Vcom1 are being sequentially supplied to the first electrodes COML, the first detection signals Vdet1 corresponding to changes in capacitance between the second electrodes TDL included in one detection electrode block BK and the first electrodes COML are supplied to the detection circuit 40 via one wire SL. The coupling circuit 18 thus can electrically integrate detection outputs from the second electrodes TDL included in the detection electrode block BK. Accordingly, the detection electrode block BK serves as one detection electrode in touch detection.

In hover detection, the coupling circuit 18 turns off the first switches SW11 to SW16 and turns on the second switches SW21 to SW24. As a result, the six coupling wires 37(1, 1), 37(2, 1), 37(3, 1), 37(4, 1), 37(5, 1), and 37(6, 1) coupled to the detection electrode block BKD(1, 1) are coupled to the wire SL21 via the second switches SW21. Similarly, the sets of coupling wires 37 coupled to the respective detection electrode blocks BKD are coupled to the wires SL22 to SL24 via the second switches SW22 to SW24, respectively.

In hover detection, the first switches SW11 to SW16 are turned off. As a result, the sets of six coupling wires 37 coupled to the respective detection electrode blocks BK are electrically decoupled from the wires SL11 to SL16. The coupling wires 37 are coupled to the wires SL21 to SL24 different from the wires SL11 to SL16.

As described above, in hover detection, the coupling circuit 18 couples the second electrodes TDL included in one detection electrode block BKD to one wire SL. As illustrated in FIG. 22, the drive circuit 14 supplies the second drive signals Vself to the detection electrode block BKD via one wire SL. The drive circuit 14 thus can collectively drive the second electrodes TDL included in the detection electrode block BKD. The second detection signals Vdet2 output from the detection electrode block BKD are supplied to the detection circuit 40 via one wire SL. Accordingly, the detection electrode block BKD serves as one detection electrode in hover detection.

As described above, the coupling circuit 18 changes the number and array of the collectively coupled second electrodes TDL between touch detection and hover detection. With this configuration, in touch detection, the second electrodes TDL arrayed in the second direction Dy are electrically coupled to one another to serve as the detection electrode block BK. In hover detection, the second electrodes TDL disposed side by side in the first direction Dx are electrically coupled to one another to serve as the detection electrode block BKD.

The configuration of the coupling circuit 18 illustrated in FIG. 23 is given by way of example only and may be appropriately modified. The coupling circuit 18, for example, may use the wires SL11 to SL16 in both of touch detection and hover detection. With this configuration, the display device 1 requires a smaller number of wires and can perform touch detection and hover detection with a smaller number of front end terminals in the detection circuit 40.

Figure 24:
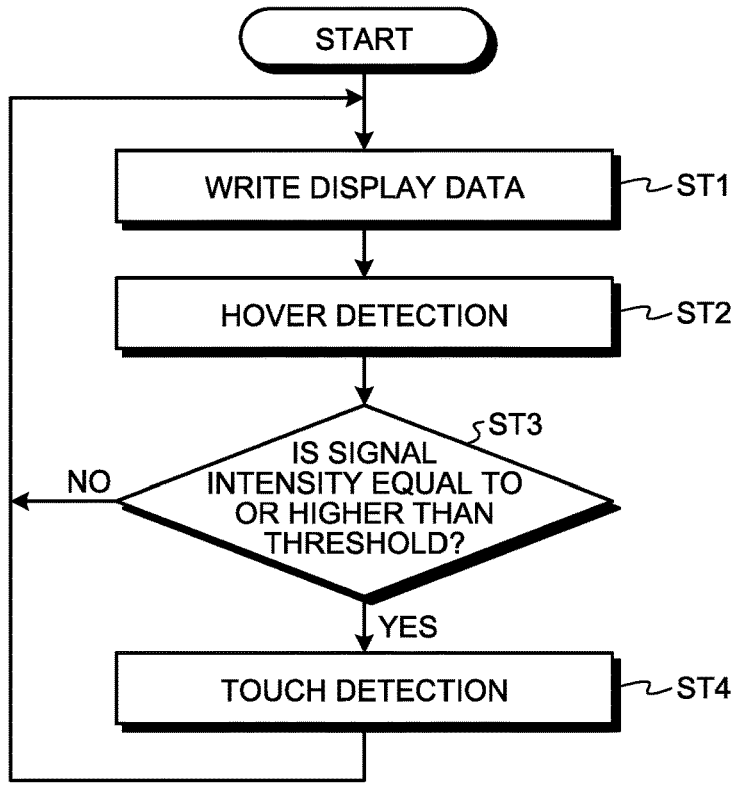
FIG. 24 is a flowchart for an exemplary operation performed by the display device according to the present embodiment.
Figure 25:
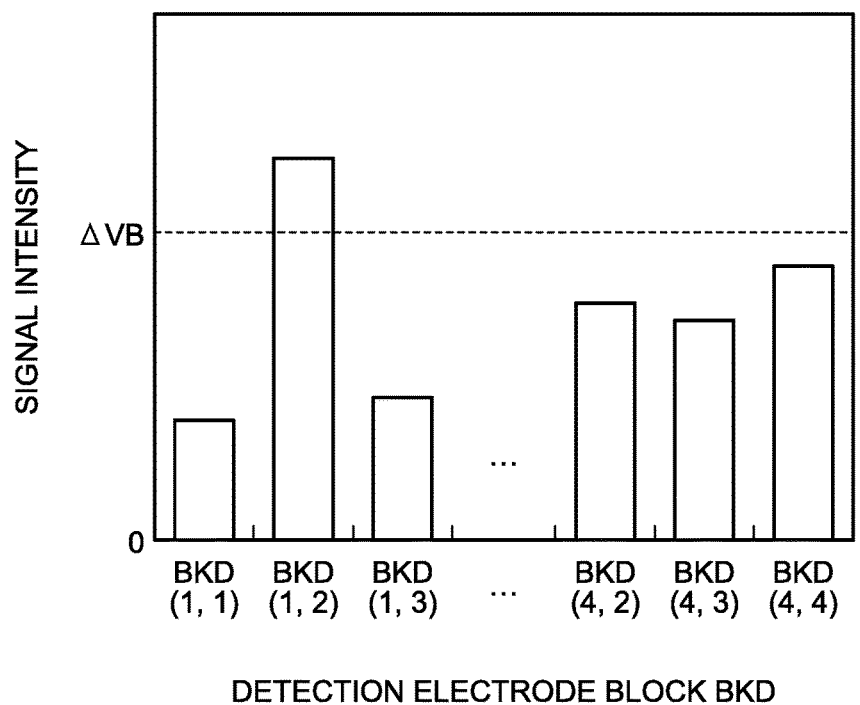
FIG. 25 is a graph schematically illustrating a relation between the detection electrode blocks and signal intensities.
Figure 26:
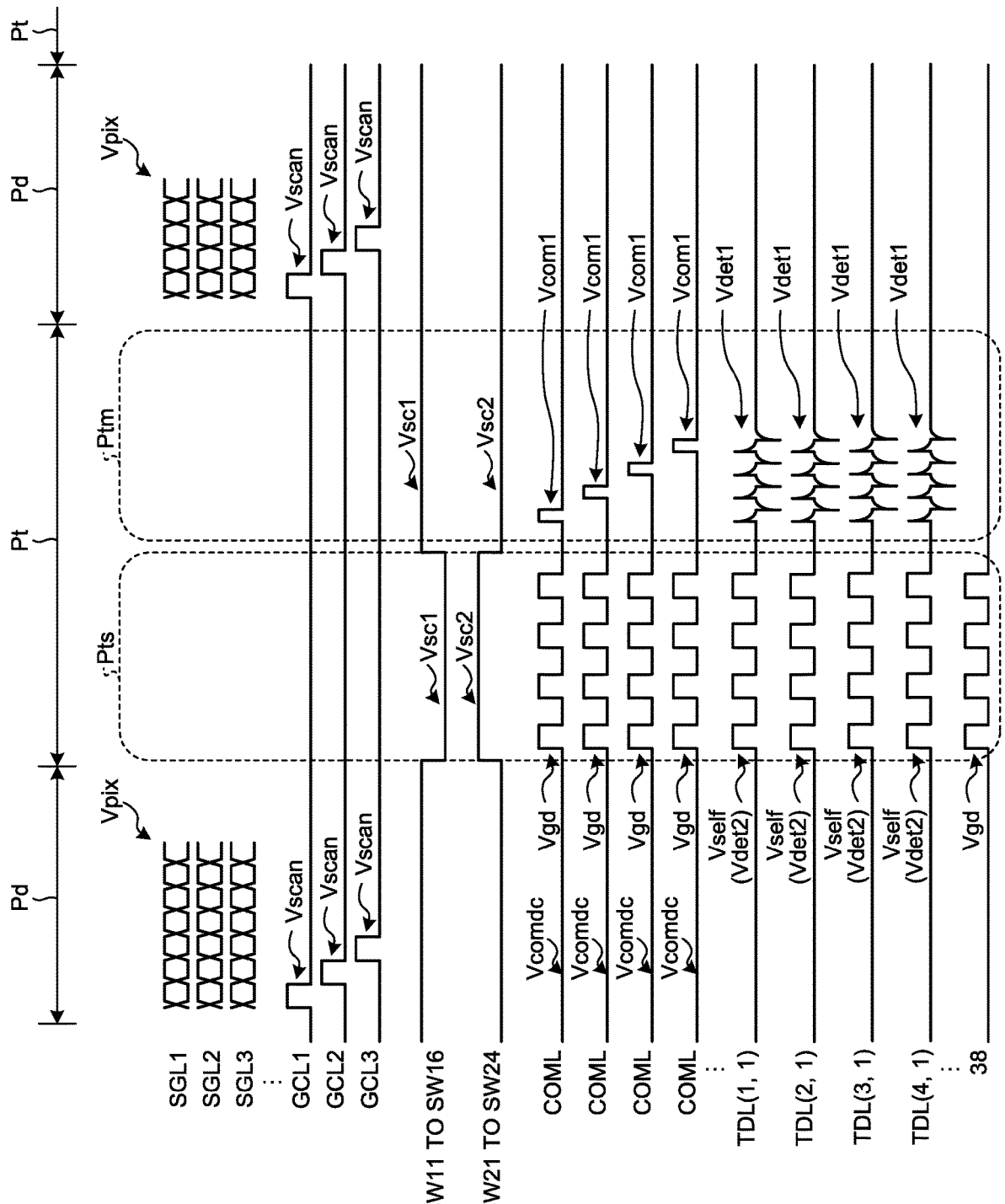
FIG. 26 is a timing waveform chart for an exemplary operation performed by the display device according to the present embodiment.

The following describes an exemplary operation according to the present embodiment with reference to FIG. 1 and FIGS. 24 to 26. FIG. 24 is a flowchart for an exemplary operation performed by the display device according to the present embodiment. FIG. 25 is a graph schematically illustrating a relation between the detection electrode blocks and signal intensities. FIG. 26 is a timing waveform chart for an exemplary operation performed by the display device according to the present embodiment. The exemplary operation illustrated in FIGS. 24 to 26 is given by way of example only and may be appropriately modified.

As illustrated in FIG. 26, display periods Pd and detection periods Pt are alternately arranged in a time-division manner. The detection period Pt includes a hover detection period Pts and a touch detection period Ptm. The execution order of the display period Pd, the hover detection period Pts, and the touch detection period Ptm is given by way of example only and may be appropriately modified. For example, one detection period Pt may include only one of the hover detection period Pts and the touch detection period Ptm. The display device 1 may perform touch detection on one detection surface in one touch detection period Ptm or a plurality of touch detection periods Ptm in a divided manner. The display device 1 may display an image of one frame in one display period Pd. Alternatively, within a period for displaying an image of one frame, a plurality of display periods Pd and a plurality of detection periods Pt may be provided such that each of the display periods Pd and each of the detection periods Pt are alternately arranged.

As illustrated in FIG. 24, the control circuit 11 writes display data first (Step ST1). Specifically, similarly to the display operation described above, the source driver 13 supplies the pixel signals Vpix to the sub-pixels SPix corresponding to gate lines GCL1, GCL2, and GCL3 via signal lines SGL1 SGL2, and SGL3. The sub-pixels SPix perform display on a one horizontal line-by-one horizontal line basis in accordance with the supplied pixel signals Vpix. As illustrated in FIG. 26, the drive circuit 14 supplies the drive signals Vcomdc for display to the first electrodes COML in the display period Pd.

Subsequently, the control circuit 11 performs hover detection (Step ST2). Specifically, as illustrated in FIG. 26, the control circuit 11 supplies the control signal Vsc1 to the coupling circuit 18 and supplies the control signal Vsc2 to the coupling circuit 18 in the hover detection period Pts. The control signals Vsc1 and Vsc2 turn off the first switches SW11 to SW16 (refer to FIG. 23) and turn on the second switches SW21 to SW24 (refer to FIG. 23). As a result, a plurality of second electrodes TDL disposed side by side in the first direction Dx are electrically coupled to one another to serve as one detection electrode block BKD.

The drive circuit 14 supplies the second drive signals Vself to the second electrodes TDL. The display device 1 thus can detect the target object in the non-contact state for each detection electrode block BKD including the second electrodes TDL disposed side by side in the first direction Dx. The detection circuit 40, for example, can detect the distance D1 between the display surface DS and the target object in the direction perpendicular to the display surface DS in accordance with the second detection signals Vdet2 supplied from the respective detection electrode blocks BKD. The detection circuit 40 can also detect the position R1 of the target object in accordance with the second detection signals Vdet2 supplied from the respective detection electrode blocks BKD. The drive circuit 14 supplies the guard signals Vgd to the first electrodes COML in the hover detection period Pts.

Subsequently, the detection circuit 40 determines whether the second detection signals Vdet2 supplied from the respective detection electrode blocks BKD are equal to or higher than a predetermined threshold ΔVB (Step ST3). As illustrated in FIG. 25, the detection circuit 40 calculates signal intensities of the second detection signals Vdet2 supplied from the respective detection electrode blocks BKD and compares them with the predetermined threshold ΔVB.

If the signal intensity of any one of the second detection signals Vdet2 is equal to or higher than the threshold ΔVB (Yes at Step ST3), the control circuit 11 performs touch detection (Step ST4). If the signal intensity of the second detection signal Vdet2 is equal to or higher than the threshold ΔVB, the detection circuit 40 determines that the target object is in the contact state. In the example illustrated in FIG. 25, the signal intensity of the second detection signal Vdet2 supplied from the detection electrode block BKD(1, 2) is equal to or higher than the threshold ΔVB. The signal intensities of the second detection signals Vdet2 supplied from the other detection electrode blocks BKD are lower than the threshold ΔVB. In this case, the detection circuit 40 determines that the target object is in the contact state at a position corresponding to the detection electrode block BKD(1, 2). The control circuit 11 switches from hover detection to touch detection based on the information supplied from the detection circuit 40.

Specifically, as illustrated in FIG. 26, the control circuit 11 supplies the control signal Vsc1 to the coupling circuit 18 and supplies the control signal Vsc2 to the coupling circuit 18 in the touch detection period Ptm. The control signals Vsc1 and Vsc2 turn on the first switches SW11 to SW16 (refer to FIG. 23) and turn off the second switches SW21 to SW24 (refer to FIG. 23). As a result, a plurality of second electrodes TDL arrayed in the second direction Dy are electrically coupled to one another to serve as one detection electrode block BK.

The drive circuit 14 sequentially supplies the first drive signals Vcom1 to the first electrodes COML. The first detection signals Vdet1 corresponding to changes in capacitance between the second electrodes TDL included in the detection electrode block BK and the first electrodes COML are supplied from the detection electrode block BK to the detection circuit 40. With this configuration, the display device 1 can detect the target object in the contact state for each detection electrode block BK including the second electrodes TDL arrayed in the second direction Dy.

In the touch detection period Ptm, when the detection operation on one detection surface is completed, that is, when the control circuit 11 has sequentially supplied the first drive signals Vcom1 to all the detection electrode blocks BK to perform touch detection, the control circuit 11 terminates touch detection and returns to writing of display data (Step ST1).

If the signal intensities of all the second detection signals Vdet2 are lower than the threshold ΔVB (No at Step ST3), the control circuit 11 does not perform touch detection and returns to writing of display data (Step ST1). In this case, in the detection period Pt illustrated in FIG. 26, the control circuit 11 performs only the processing of the hover detection period Pts and does not perform the processing of the touch detection period Ptm. In other words, only the hover detection period Pts is present in one detection period Pt.

In the hover detection period Pts and the touch detection period Ptm, the signal lines SGL are preferably in a floating state, which is not illustrated in FIG. 26. This mechanism can reduce capacitance between the second electrodes TDL and the signal lines SGL. The gate lines GCL may be in a floating state in the hover detection period Pts.

The exemplary operation illustrated in FIGS. 24 to 26 is given by way of example only and may be appropriately modified. The display device 1, for example, may perform hover detection while changing the second electrodes TDL included in one detection electrode block BKD in a plurality of hover detection periods Pts. The control circuit 11 can change a resolution in hover detection by changing the number of second electrodes TDL included in one detection electrode block BKD depending on the distance D1 between the display surface DS and the target object.

As described above, the detection device includes at least the first substrate 21, the first electrodes COML, the second electrodes TDL, and the coupling circuit 18. The first electrodes COML extend in the first direction Dx of the first substrate 21 and are arrayed in the second direction Dy intersecting the first direction Dx. The second electrodes TDL are arrayed in a matrix (row-column configuration) in a layer different from that of the first electrodes COML. The coupling circuit 18 switches between the first coupling state of electrically coupling a plurality of second electrodes TDL arrayed in the second direction Dy to one another, and the second coupling state of electrically coupling a plurality of second electrodes TDL to one another, a combination of the second electrodes being different from that in the first coupling state. The coupling circuit 18 switches to the first coupling state in hover detection (first detection mode) and to the second coupling state in touch detection (second detection mode). With this configuration, the detection device can desirably perform touch detection and hover detection.

In the second coupling state, the coupling circuit 18 electrically couples the second electrodes TDL disposed side by side in the first direction Dx to one another. This mechanism increases the apparent area of the second electrodes TDL in planar view, thereby increasing the detection sensitivity in hover detection.

The electric-field transmission regions TDD are formed at positions overlapping the first electrodes COML in planar view. With this structure, the fringe electric field can pass through the second electrodes TDL in the direction perpendicular to the first substrate 21 through the electric-field transmission regions TDD. As a result, in touch detection, the lines of electric force Ef (refer to FIG. 17) of the fringe electric field extend from the first electrodes COML; pass through the electric-field transmission regions TDD; and then extend toward the second electrodes TDL. In other words, the number of lines of electric force Ef of the fringe electric field is larger than that in a case where the second electrodes TDL without electric-field transmission region TDD are disposed so as to completely cover the first electrodes COML. This structure can increase the detection sensitivity in touch detection. Accordingly, the display device 1 according to the present embodiment can desirably perform touch detection and hover detection while using the second electrodes TDL in both of touch detection and hover detection.

Figure 27:
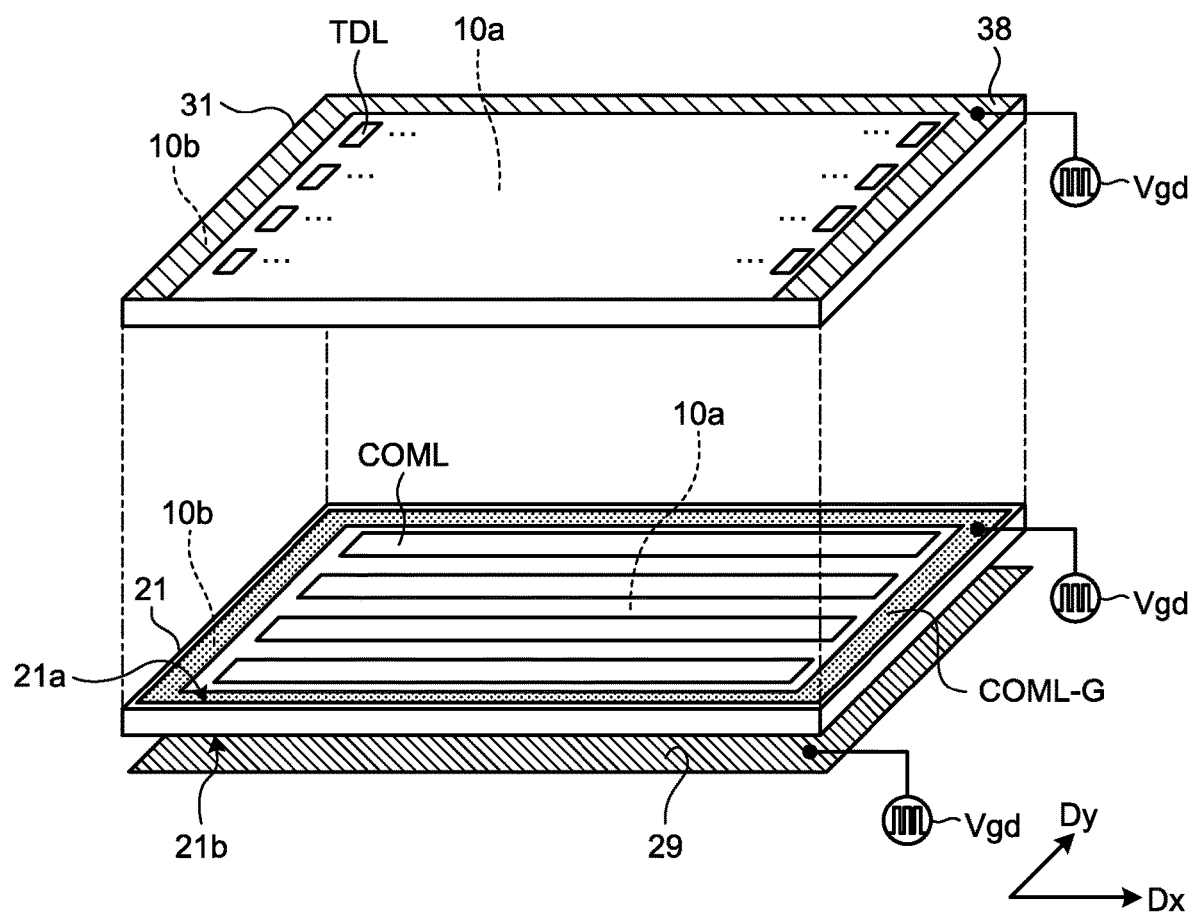
FIG. 27 is a perspective view illustrating exemplary arrangement of the second electrodes and the first electrodes.

FIG. 27 is a perspective view illustrating exemplary arrangement of the second electrodes and the first electrodes. As described above, when the display device 1 performs self-capacitance hover detection, the outer edge wires 38 are supplied with the guard signals Vgd having the same waveform as that of the second drive signals Vself for detection and synchronized with the second drive signals Vself. Alternatively, the outer edge wires 38 may be brought into a state of being not electrically coupled to any component (high impedance state), instead of being supplied with the guard signals Vgd.

The first electrodes COML are provided in the active area 10a on a first surface 21a of the first substrate 21. The first surface 21a, for example, is opposite to a second surface 21b.

As illustrated in FIG. 27, the peripheral region 10b on the first surface 21a of the first substrate 21 is provided with outer edge wires COML-G. The outer edge wires COML-G, for example, are continuous along the long sides and the short sides of the active area 10a to surround the active area 10a. When the display device 1 performs self-capacitance hover detection, the outer edge wires COML-G may be supplied with the guard signals Vgd having the same waveform as that of the drive signals Vself for detection and synchronized with the drive signals Vself. Alternatively, the outer edge wires COML-G may be brought into a state of not being electrically coupled to any component (high impedance state). This mechanism can prevent generation of capacitance between the outer edge wires COML-G and the first electrodes COML supplied with the second drive signals Vself, thereby increasing sensitivity in hover detection.

The present embodiment may include outer edge wires 29 on the second surface 21b of the first substrate 21. The outer edge wires 29 on the rear surface may cover part of the second surface 21b of the first substrate 21 or the entire second surface 21b. The outer edge wires 29 on the rear surface may be made of a translucent conductive material, such as ITO, or may be a metal frame, which is not illustrated, for example. When the display device 1 performs self-capacitance hover detection, the outer edge wires 29 on the rear surface may be supplied with the guard signals Vgd having the same waveform as that of the second drive signals Vself for detection and synchronized with the second drive signals Vself. Alternatively, the outer edge wires 29 on the rear surface may be brought into a state of not being electrically coupled to any component (high impedance state). This mechanism can prevent generation of capacitance between the outer edge wires 29 on the rear surface and the first electrodes COML supplied with the second drive signals Vself, thereby increasing sensitivity in hover detection.

Second Embodiment

Figure 28:
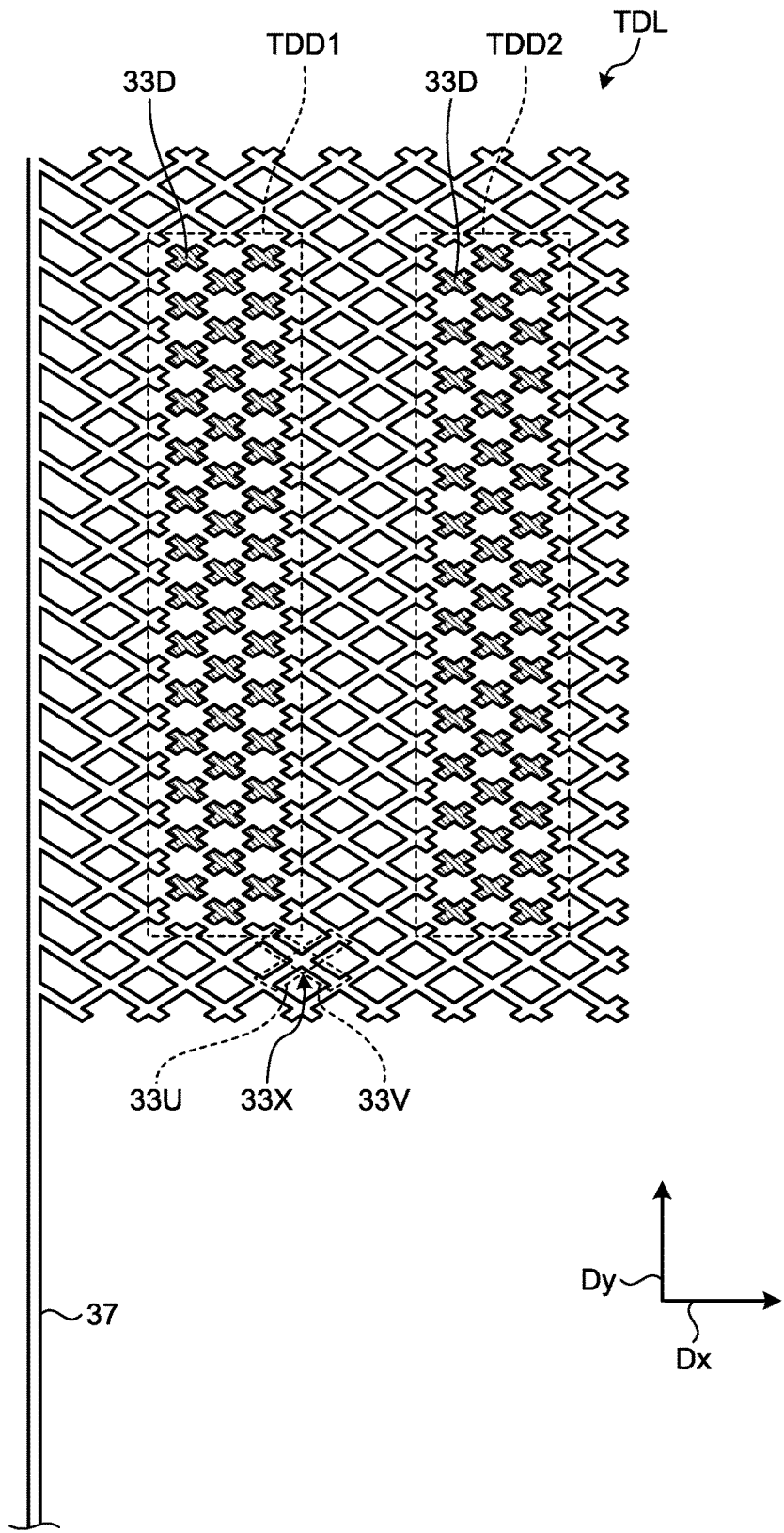
FIG. 28 is a schematic view illustrating the second electrode according to a second embodiment of the present disclosure.

FIG. 28 is a schematic view illustrating the second electrode according to a second embodiment of the present disclosure. Components described in the first embodiment are denoted by like reference numerals, and explanation thereof is omitted.

The second electrode TDL according to the second embodiment includes at least one first conductive thin wire 33U and at least one second conductive thin wire 33V intersecting the first conductive thin wire 33U. The first conductive thin wire 33U and the second conductive thin wire 33V are electrically coupled to each other at a coupling portion 33X. A plurality of first conductive thin wires 33U intersect a plurality of second conductive thin wires 33V at a plurality of intersections. With this structure, one mesh of the second electrode TDL has a parallelogram shape. The first conductive thin wire 33U and the second conductive thin wire 33V incline in mutually opposite directions with respect to a direction parallel to the first direction Dx.

While the second electrode TDL includes the first conductive thin wires 33U and the second conductive thin wires 33V, the area of the second electrode TDL or the area of the detection electrode block BKD according to the present disclosure includes the area of openings surrounded by the first conductive thin wires 33U and the second conductive thin wires 33V in addition to the area of the first conductive thin wires 33U and the second conductive thin wires 33V. In other words, the area of the second electrode TDL or the area of the detection electrode block BKD corresponds to the area of a substantially rectangular region surrounding the first conductive thin wires 33U and the second conductive thin wires 33V.

The first conductive thin wires 33U and the second conductive thin wires 33V each have a small width. In the active area 10a illustrated in FIG. 28, the first conductive thin wires 33U are disposed with a space interposed therebetween in the second direction Dy. The second conductive thin wires 33V are disposed with a space interposed therebetween in the second direction Dy.

First ends in the extending directions of the first conductive thin wires 33U and the second conductive thin wires 33V are coupled to the coupling wire 37. The coupling wire 37 passes between the second electrodes TDL facing each other in the first direction Dx; extends from the active area 10a; and is coupled to the flexible substrate 72 provided in the peripheral region 10b (refer to FIG. 15). With this configuration, the first conductive thin wires 33U and the second conductive thin wires 33V are electrically coupled to each other to serve as one second electrode TDL. One second electrode TDL according to the present embodiment is coupled to one coupling wire 37. The second electrode TDL has a substantially rectangular shape. The shape of the second electrode TDL is not limited thereto, and may be another shape, such as a square, polygonal, or elliptic shape.

The first conductive thin wires 33U and the second conductive thin wires 33V are metal layers made of one or more of aluminum (Al), copper (Cu), silver (Ag), molybdenum (Mo), chromium (Cr), and tungsten (W). Alternatively, the first conductive thin wires 33U and the second conductive thin wires 33V are made of an alloy including one or more of the metal materials described above. The first conductive thin wires 33U and the second conductive thin wires 33V may be multilayered bodies including a plurality of conductive layers made of the metal materials described above or an alloy including one or more of the materials. The first conductive thin wires 33U and the second conductive thin wires 33V may be multilayered bodies including conductive layers made of translucent conductive oxide, such as ITO. Alternatively, the first conductive thin wires 33U and the second conductive thin wires 33V may be multilayered bodies including blackened films, black organic films, or black conductive organic films obtained by combining the metal materials and the conductive layers described above.

The metal materials described above have resistance lower than that of translucent conductive oxide, such as ITO. The metal materials described above have a light-shielding property higher than that of translucent conductive oxide. As a result, the transmittance may be reduced, or the patterns of the second electrodes TDL may be visually recognized. One second electrode TDL according to the present embodiment includes a plurality of first conductive thin wires 33U and a plurality of second conductive thin wires 33V each having a small width. The first conductive thin wires 33U are disposed with a space interposed therebetween, and the second conductive thin wires 33V are disposed with a space therebetween, each space being larger than the width of each of the first conductive thin wire 33U and the second conductive thin wire 33V. This configuration can reduce the resistance and prevent the second electrodes TDL from being visually recognized. As a result, the second electrodes TDL have lower resistance, and the display device 1 can have a smaller thickness, a larger screen, or higher definition.

The width of the first conductive thin wire 33U and the second conductive thin wire 33V is preferably from 1 μm to 10 μm inclusive and more preferably from 1 μm to 5 μm inclusive. If the first conductive thin wire 33U and the second conductive thin wire 33V each have a width of 10 μm or smaller, the area covering apertures is reduced in the active area 10a, where the apertures correspond to regions in which transmission of light is not suppressed by a black matrix or the gate lines GCL and the signal lines SGL. This lowers the possibility of an aperture ratio loss. If the first conductive thin wire 33U and the second conductive thin wire 33V each have a width of 1 μm or larger, they have a stable shape, and thus are less likely to be disconnected.

The second electrode TDL does not necessarily include mesh-shaped metal thin wires and may include a plurality of zigzag-line-shaped or wavy-line-shaped metal thin wires, for example. Dummy electrodes not serving as detection electrodes may be provided between the second electrodes TDL. The dummy electrode may have a mesh-shaped, zigzag-line-shaped, or wavy-line-shaped pattern similar to that of the second electrode TDL. The electric potential of the dummy electrodes is not fixed.

As illustrated in FIG. 28, the second electrode TDL includes an electric-field transmission region TDD1 and an electric-field transmission region TDD2. The electric-field transmission regions TDD1 and TDD2 are each provided with a plurality of dummy electrodes 33D the electric potential of which is not fixed. The dummy electrodes 33D are not electrically coupled to each other. The dummy electrodes 33D are not electrically coupled to the first conductive thin wires 33U or the second conductive thin wires 33V. As described above, the electric potential of the dummy electrodes 33D is not fixed. With this configuration, the dummy electrodes 33D have a smaller effect of shielding the fringe electric field (FIG. 17) in touch detection. As a result, in touch detection, the lines of electric force Ef of the fringe electric field extend from the first electrode COML; pass through the electric-field transmission regions TDD; and extend toward the second electrode TDL.

The dummy electrode 33D includes a conductive thin wire having the same inclination as that of the first conductive thin wires 33U with respect to the direction parallel to the first direction Dx and a conductive thin wire having the same inclination as that of the second conductive thin wires 33V with respect to the direction parallel to the first direction Dx. This structure prevents the electric-field transmission regions TDD1 and TDD2 from being visually recognized with respect to the first conductive thin wires 33U and the second conductive thin wires 33V.

The length of the electric-field transmission regions TDD1 and TDD2 in the second direction Dy is longer than that in the first direction Dx. With this structure, the electric-field transmission regions TDD1 and TDD2 overlap the first electrodes COML arrayed in the second direction Dy in planar view.

First Modification

Figure 29:
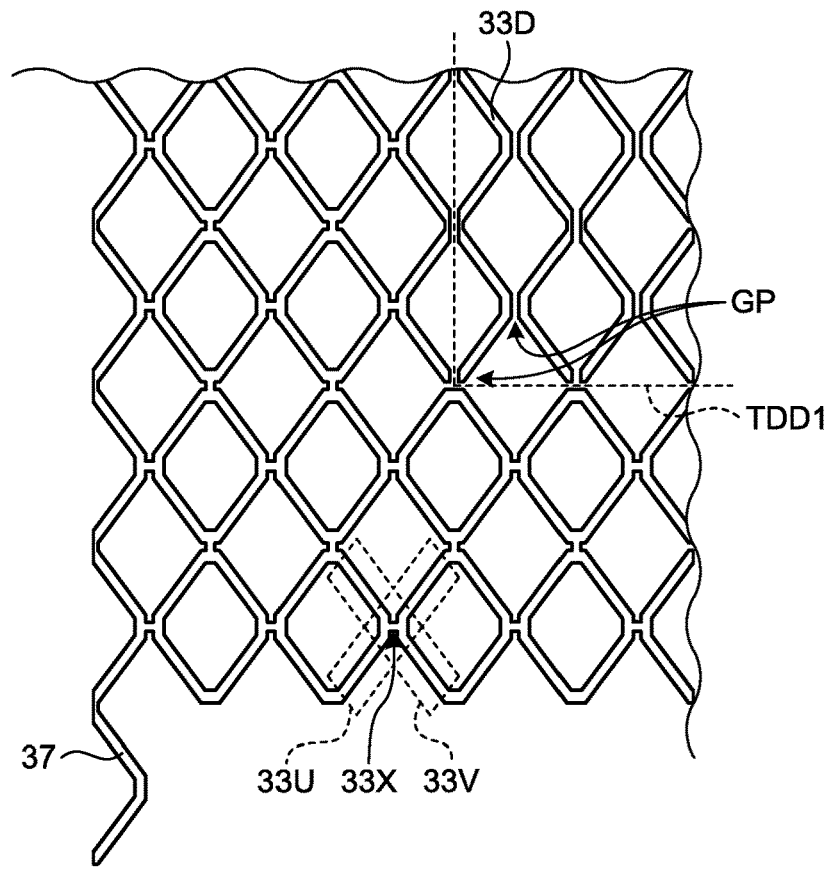
FIG. 29 is a partially enlarged view of the second electrode according to a first modification of the second embodiment.

FIG. 29 is a partially enlarged view of the second electrode according to a first modification of the second embodiment. The coupling wire 37 according to the first modification has a zigzag-line or wavy-line shape. The coupling wire 37 includes conductive thin wires having the same inclination as that of the first conductive thin wires 33U with respect to the direction parallel to the first direction Dx and conductive thin wires having the same inclination as that of the second conductive thin wires 33V with respect to the direction parallel to the first direction Dx. This structure prevents the coupling wire 37 from being visually recognized with respect to the first conductive thin wires 33U and the second conductive thin wires 33V.

In the configuration according to the first modification, the first conductive thin wires 33U and the second conductive thin wires 33V are coupled to each other to have a parallelogram shape. In the electric-field transmission region TDD1, the coupling portions 33X each have a slit GP without a conductive material to form the dummy electrodes 33D.

Second Modification

Figure 30:
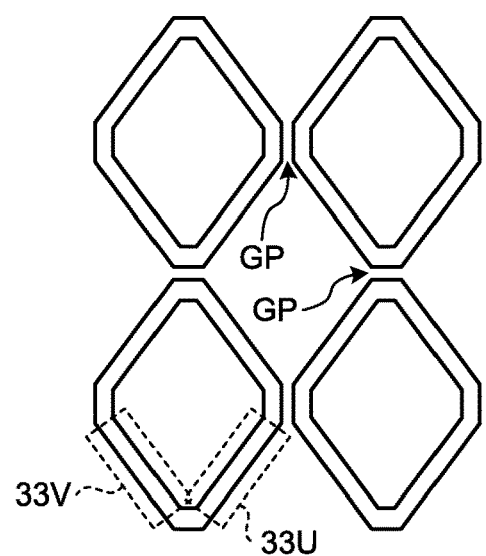
FIG. 30 is a partially enlarged view of the second electrode according to a second modification of the second embodiment.

FIG. 30 is a partially enlarged view of the second electrode according to a second modification of the second embodiment. In the configuration according to the second modification, two first conductive thin wires 33U and two second conductive thin wires 33V are coupled to each other. The conductive thin wires each having a parallelogram shape are arrayed in the electric-field transmission regions TDD1 and TDD2 (refer to FIG. 28).

Third Modification

Figure 31:
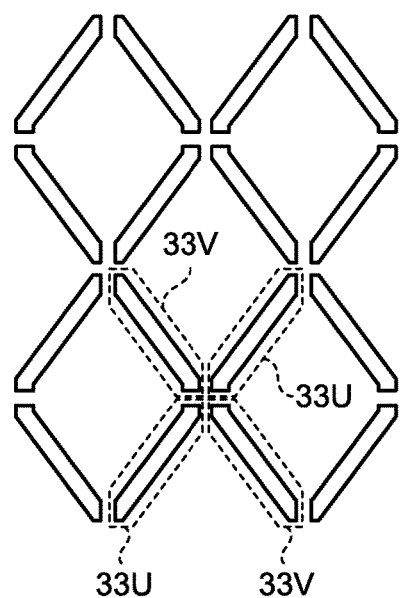
FIG. 31 is a partially enlarged view of the second electrode according to a third modification of the second embodiment.

FIG. 31 is a partially enlarged view of the second electrode according to a third modification of the second embodiment. In the configuration according to the third modification, the first conductive thin wire 33U and the second conductive thin wire 33V are separated from each other. The separated linear conductive thin wires are arrayed in the electric-field transmission regions TDD1 and TDD2 (refer to FIG. 28).

Third Embodiment

Figure 32:
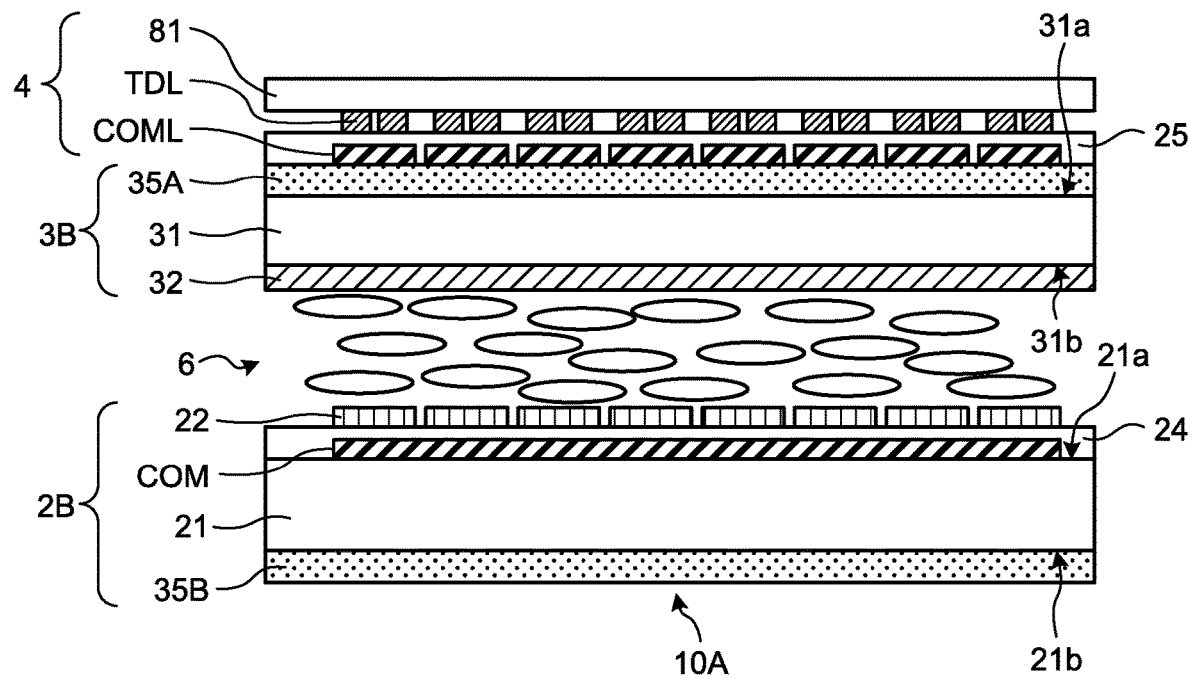
FIG. 32 is a sectional view of an exemplary configuration of the detection device and the display device according to a third embodiment of the present disclosure.

FIG. 32 is a sectional view of an exemplary configuration of the detection device and the display device according to a third embodiment of the present disclosure. As illustrated in FIG. 32, a display panel 10A according to the third embodiment includes a pixel substrate 2B, a counter substrate 3B, the liquid crystal layer 6, and a detection device 4. The counter substrate 3B faces the pixel substrate 2B in a direction perpendicular to the surface of the pixel substrate 2B. The liquid crystal layer 6 is disposed between the pixel substrate 2B and the counter substrate 3B. The detection device 4 is disposed on the surface of the counter substrate 3B opposite to the surface facing the liquid crystal layer 6.

The pixel substrate 2B includes the first substrate 21, a common electrode COM, the insulating layer 24, the pixel electrodes 22, and the polarizing plate 35B. The common electrode COM is provided on the first surface 21a of the first substrate 21. The insulating layer 24 is provided on the first surface 21a to cover the common electrode COM. The pixel electrodes 22 are provided on the insulating layer 24. The polarizing plate 35B is provided on the second surface 21b of the first substrate 21. In the display periods Pd (refer to FIG. 26), the drive signals Vcomdc for display are supplied to the common electrode COM. The counter substrate 3B includes the second substrate 31, the polarizing plate 35A, and the color filter 32. The polarizing plate 35A is provided on a first surface 31a of the second substrate 31. The color filter 32 is provided on a second surface 31b of the second substrate 31.

The detection device 4 includes a plurality of first electrodes COML, an insulating layer 25, a plurality of second electrodes TDL, and a cover glass 81, for example. The first electrodes COML are provided on the polarizing plate 35A. The insulating layer 25 is provided on the polarizing plate 35A to cover the first electrodes COML. The second electrodes TDL are provided on the insulating layer 25. The cover glass 81 is provided on the insulating layer 25 to cover the second electrodes TDL. The detection device 4 also includes wires (not illustrated) coupled to the second electrodes TDL and wires (not illustrated) coupled to the first electrodes COML. With this configuration, the detection device 4 can desirably perform touch detection and hover detection similarly to the detection device according to the first embodiment.

While exemplary embodiments have been described, the embodiments are not intended to limit the present disclosure. The contents disclosed in the embodiments are given by way of example only, and various changes may be made without departing from the spirit of the present disclosure. Appropriate changes made without departing from the spirit of the present disclosure naturally fall within the technical scope of the disclosure.

The shapes, the positions, and the numbers of the first electrodes COML, the second electrodes TDL, the pixel electrodes 22, and other components are given by way of example only and may be appropriately modified.

The display device according to the present aspect may have the following aspects, for example.

(1) A detection device comprising:
at least one substrate;
a plurality of first electrodes extending in a first direction of the substrate and are arrayed in a second direction intersecting the first direction;
a plurality of second electrodes arrayed in a row-column configuration in a layer different from a layer of the first electrodes; and
a coupling circuit configured to switch between a first coupling state of electrically coupling a plurality of second electrodes arrayed in the second direction to one another, and a second coupling state of electrically coupling a plurality of second electrodes to one another, wherein
a combination of the second electrodes in the second coupling state is different from a combination of the second electrodes in the first coupling state.

(2) The detection device according to (1), wherein the coupling circuit electrically couples the second electrodes disposed side by side in the first direction to one another in the second coupling state.

(3) The detection device according to (1) or (2), wherein the second electrodes each have an electric-field transmission region, in which an electric filed can pass through the second electrodes in a direction perpendicular to the substrate, and
the electric-field transmission region overlaps a corresponding first electrode of the first electrodes.

(4) The detection device according to (3), wherein the electric-field transmission region is provided with a dummy electrode.

(5) The detection device according to (4), wherein
the dummy electrode is made of a conductive material, and
an electric potential of the dummy electrode is not fixed.

(6) The detection device according to any one of (3) to (5), wherein the electric-field transmission region has an outer shape, in which a length in the second direction is longer than a length in the first direction.

(7) The detection device according to any one of (3) to (6), wherein each of the second electrodes includes a plurality of the electric-field transmission regions.

(8) The detection device according to any one of (1) to (7), wherein the second electrodes each have an outer shape in which a length in the second direction is longer than a length in the first direction.

(9) The detection device according to any one of (1) to (8), further comprising:
a drive circuit configured to supply a first drive signal to the first electrodes and supply a second drive signal to the second electrodes; and
a control circuit having a first detection mode of detecting a target object in contact with a detection surface in accordance with a first detection signal corresponding to a change in mutual capacitance between the first electrodes and the second electrodes when the first drive signal is supplied to the first electrodes, and a second detection mode of detecting the target object in a non-contact state with respect to the detection surface in accordance with a second detection signal corresponding to a change in self-capacitance in the second electrodes when the second drive signal is supplied to the second electrodes.

(10) The detection device according to (9), wherein the coupling circuit switches to the first coupling state in the first detection mode and to the second coupling state in the second detection mode.

(11) The detection device according to any one of (1) to (10), further comprising:
a plurality of coupling wires coupled to the respective second electrodes, wherein
the coupling circuit is coupled to the second electrodes via the respective coupling wires.

(12) The detection device according to any one of (1) to (11), wherein the second electrodes each include a plurality of metal wires having a mesh, zigzag-line, or wavy-line shape.

(13) The detection device according to (9), wherein the drive circuit supplies a signal synchronized with the second drive signal and having an electric potential identical to an electric potential of the second drive signal to the first electrodes in the second detection mode.

(14) A display device comprising:
a display panel including the detection device according to any one of (1) to (13) and a display region, wherein
the second electrodes are provided in a region overlapping the display region.

What is claimed is:

1. A detection device comprising:
at least one substrate;
a plurality of first electrodes extending in a first direction of the substrate and arrayed in a second direction intersecting the first direction;
a plurality of second electrodes arrayed in a row-column configuration in a layer different from a layer of the first electrodes; and
a coupling circuit configured to switch between a first coupling state of electrically coupling a plurality of second electrodes arrayed in the second direction to one another, and a second coupling state of electrically coupling a plurality of second electrodes to one another, wherein
a combination of the second electrodes in the second coupling state is different from a combination of the second electrodes in the first coupling state,
the second electrodes each have an electric-field transmission region, in which an electric filed can pass through the second electrodes in a direction perpendicular to the substrate,
the electric-field transmission region overlaps a corresponding first electrode of the first electrodes, and
the electric-field transmission region is provided with a dummy electrode.

2. The detection device according to claim 1, wherein the dummy electrode is made of a conductive material, and
an electric potential of the dummy electrode is not fixed.

3. A detection device comprising:
at least one substrate;
a plurality of first electrodes extending in a first direction of the substrate and arrayed in a second direction intersecting the first direction;
a plurality of second electrodes arrayed in a row-column configuration in a layer different from a layer of the first electrodes;
a coupling circuit configured to switch between a first coupling state of electrically coupling a plurality of second electrodes arrayed in the second direction to one another and a second coupling state of electrically coupling a plurality of second electrodes to one another, a combination of the second electrodes in the second coupling state being different from a combination of the second electrodes in the first coupling state;
a drive circuit configured to supply a first drive signal to the first electrodes and supply a second drive signal to the second electrodes; and
a control circuit having a first detection mode of detecting a target object in contact with a detection surface in accordance with a first detection signal corresponding to a change in mutual capacitance between the first electrodes and the second electrodes when the first drive signal is supplied to the first electrodes, and a second detection mode of detecting the target object in a non-contact state with respect to the detection surface in accordance with a second detection signal corresponding to a change in self-capacitance in the second electrodes when the second drive signal is supplied to the second electrodes.

4. The detection device according to claim 3, wherein the coupling circuit switches to the first coupling state in the first detection mode and to the second coupling state in the second detection mode.

5. The detection device according to claim 3, wherein the drive circuit supplies a signal synchronized with the second drive signal and having an electric potential identical to an electric potential of the second drive signal to the first electrodes in the second detection mode.

* * * * *